United States Patent
Ma et al.

(10) Patent No.: US 7,468,689 B2
(45) Date of Patent: Dec. 23, 2008

(54) SYSTEM AND METHOD FOR DETERMINING POSITION OF RADAR APPARATUS BASED ON REFLECTED SIGNALS

(75) Inventors: Yugang Ma, Singapore (SG); Xiaobing Sun, Singapore (SG); Jin Xu, Singapore (SG); Kanzo Okada, Singapore (SG)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 11/169,119

(22) Filed: Jun. 28, 2005

(65) Prior Publication Data
US 2008/0218404 A1    Sep. 11, 2008

(30) Foreign Application Priority Data

| | | | |
|---|---|---|---|
| Jun. 28, 2004 | (SG) | | 200403720-6 |
| Jan. 12, 2005 | (SG) | | 200500140-9 |
| Jun. 27, 2005 | (SG) | | 200504081-1 |

(51) Int. Cl.
*G01S 13/42* (2006.01)
*G01S 13/48* (2006.01)
*G01S 7/03* (2006.01)

(52) U.S. Cl. .................. 342/146; 342/453; 342/159
(58) Field of Classification Search .......... 342/146
See application file for complete search history.

(56) References Cited

U.S. PATENT DOCUMENTS

| | | | | |
|---|---|---|---|---|
| 3,573,820 | A | * | 4/1971 | Bohacek ............... 342/91 |
| 3,976,151 | A | | 8/1976 | Farque |
| 3,995,270 | A | * | 11/1976 | Perry et al. ........... 342/93 |
| 4,089,002 | A | * | 5/1978 | Kerr et al. ............ 342/93 |
| 4,107,676 | A | * | 8/1978 | Lassiter ............... 342/46 |
| 4,489,319 | A | * | 12/1984 | Hansen ............... 342/93 |
| 4,536,764 | A | * | 8/1985 | Freeman .............. 342/91 |
| 4,543,580 | A | * | 9/1985 | Bent et al. ............ 342/460 |

(Continued)

OTHER PUBLICATIONS http://mathworld.wolfram.com/NonlinearLeastSquaresFitting.html, pp. 1 of 3.

(Continued)

*Primary Examiner*—Thomas G. Black
*Assistant Examiner*—Shelley Chen
(74) *Attorney, Agent, or Firm*—Frommer Lawrence & Haug LLP; William S. Frommer; Thomas F. Presson

(57) ABSTRACT

A system and method for determining position of, for example, a robot based on reflected signals comprises a transmitter for transmitting signals in a number of directions within a range of directions and a receiver for receiving echoes of the signals from any direction in the range. The transmitter has a first rotatable antenna and the receiver has a second rotatable antenna which is mechanically couplable to the second antenna. The received echoes are processed by a processor to derive echo data signals indicative of the distance of the system to one or more reflective surfaces and the direction of the reflective surface(s) relative to the system. The processor is arranged to determine the position of the system relative to a starting position from the derived echo data signals indicative of the distance of the system to the reflective surface(s) and the direction of the reflective surface(s) relative to the system.

61 Claims, 15 Drawing Sheets

U.S. PATENT DOCUMENTS

| | | | |
|---|---|---|---|
| 4,608,567 A * | 8/1986 | Bryant et al. | 342/91 |
| 5,247,306 A | 9/1993 | Hardange et al. | |
| 5,703,592 A * | 12/1997 | Watts | 342/93 |
| 5,977,958 A | 11/1999 | Baron et al. | |
| 6,054,950 A | 4/2000 | Fontana | |
| 6,112,095 A | 8/2000 | Wax et al. | |
| 6,185,174 B1 | 2/2001 | Belser | |
| 6,201,496 B1 | 3/2001 | Lee | |
| 6,411,250 B1 * | 6/2002 | Oswald et al. | 342/70 |
| 6,456,231 B1 * | 9/2002 | McEwan | 342/93 |
| 6,529,460 B1 | 3/2003 | Belser | |
| 6,593,875 B2 * | 7/2003 | Bergin et al. | 342/121 |
| 6,646,596 B2 | 11/2003 | Syrjarinne et al. | |
| 6,671,622 B2 | 12/2003 | McCall et al. | |
| 6,701,633 B2 | 3/2004 | Ohtsuka | |
| 6,707,424 B1 | 3/2004 | Snyder et al. | |
| 6,747,599 B2 * | 6/2004 | McEwan | 342/463 |
| 2003/0071754 A1 * | 4/2003 | McEwan | 342/464 |
| 2003/0102999 A1 * | 6/2003 | Bergin et al. | 342/121 |

OTHER PUBLICATIONS http://mathworld.wolfram.com, pp. 1 of 2.

* cited by examiner

SYSTEM AND METHOD FOR DETERMINING POSITION OF RADAR APPARATUS BASED ON REFLECTED SIGNALS

FIELD OF THE INVENTION

The present invention relates to a system and method for determining position of a system based on reflected signals.

BACKGROUND OF THE INVENTION

Positioning is a common requirement for many applications such as robot control, fire fighting, and entertainment. Many conventional methods for determining the position of an object are based on external reference points such as those described in U.S. Pat. Nos. 6,707,424 and 6,646,596.

The reference points may be active, such as a transmitter or receiver, or passive such as a reflector. The position of the device may be calculated by measuring the distance, delay and/or direction from the reference point to the device. Whilst these methods for determining the position of a device may perform well, the requirement of pre-setting the reference points is not generally convenient and may even be impossible in some situations.

Many conventional methods use a transmitter/receiver device in conjunction with at least one active/reflective device situated at a pre-determined position as a point of reference. Frequently, a system is provided which is capable of monitoring its own position relative to the active/reflective device, and this system is attached to the object. The best known of such systems is the GPS system, using satellites.

U.S. Pat. Nos. 5,977,958 and 6,054,950 describe methods for measuring time-of-arrival with ultrashort RF pulses (UWB) transmitted from a transmitter to an array of receivers. Despite the differences in technical details, both patents require devices at pre-known positions. U.S. Pat. No. 5,977,958 uses four receivers for its 2D scenario and U.S. Pat. No. 6,054,950 needs at least four receivers or beacons for 3D applications (these receivers or beacons are here termed "explicit references"). There are other similar technologies which are based on angles of arrival of received signals instead of their times of arrival. In such technologies, multiple references are needed. Again, the problem with this type of system is the requirement for references at pre-known positions, which increases the number of devices needed and introduces difficulty in setting up the systems in certain situations or surroundings. Furthermore, such systems require direct line of sight (LOS) between the transmitter and receivers, and the performance decreases sharply in the areas where LOS is not available.

Self-positioning methods employed in robotics often use a ring of ultrasonic transducers or laser range finders to obtain a measurement of the respective distance from an object to a surrounding environment in each of a number of directions. A sonar/laser range image may be formed from the distances between the detector and nearby objects. This image may be compared to a known floor plan or trained database in order to find the location of the robot. However, the known floor plan information and trained database may not be available in some environments.

Another U.S. Pat. No. 6,112,095 proposes a method of location determination in which a transmitter transmits a radio signal and a receiver device uses an array of antennas to receive the signal both directly and along paths which include reflections (multipath signals). Different locations of the transmitter cause the set of reflected paths to differ, so the received signals constitute a signature of the position. The determination of the location of the transmitter is based on a set of pre-calibrated signal covariance matrices corresponding to possible transmitter locations. However, the uniqueness of the signature is, in principle, not guaranteed and sometimes leads to large errors when the multipath features of one location are similar to those of other locations. Furthermore, the teaching in this citation is intended for outdoor application, and a base-station is required for its implementation.

A type of self-positioning device for vehicle use is described in U.S. Pat. No. 6,671,622. Another form of positioning system is able to determine its location without the need of external references, by using a north finder, an inertial measuring system, a velocimeter and an odometer. Such systems are very convenient, but the calculated position may not be sufficiently accurate.

In view of the foregoing problems with conventional methods and devices, a need exists for an easily applied self-positioning method which does not require the pre-setting of external reference points.

SUMMARY OF THE INVENTION

In general terms, the present invention proposes a method and system for determining the position of a device by transmitting/receiving reflection signals to/from surrounding objects, and calculating the distances to the objects and the directions of reflections so as to determine the position of the device itself.

An advantage of a preferred embodiment is that there is no need to pre-set external references to obtain the position of the device and the method and system is thereby reference-free and self-positioning. Also, there is no need for training the system to enable its operation nor to include a database or floor plan in the system.

The signal used for the distance and direction estimations in a preferred embodiment may be, for example, narrow-band radio frequency (RF), ultra-wide band (UWB), ultrasound or infrared signals.

A further advantage of one or more embodiments of the invention is that the position information may be calculated in real-time.

According to a first aspect of the present invention there is provided a system comprising:
 a transmitter for transmitting signals in a number of directions within a range of directions; wherein the transmitter comprises a first rotatable antenna;
 a receiver for receiving echoes of the signals from any direction in the range; wherein the receiver comprises a second rotatable antenna, the first antenna being mechanically couplable to the second antenna; and
 a processor for processing the received echoes to derive echo data signals indicative of the distance of the system to one or more reflective surfaces and the direction of the one or more reflective surfaces relative to the system; wherein the processor is arranged to determine the position of the system relative to a starting position from the derived echo data signals indicative of the distance of the system to one or more of the one or more reflective surfaces and the direction of the one or more of the one or more reflective surfaces relative to the system.

In a preferred embodiment, the first and/or second antennae comprise one or more mechanically rotatable antennae each having an associated beam pattern gain associated with a beam pattern, the system further comprising one or more electrically rotatable antennae, wherein the one or more electrically rotatable antennae are arranged to be rotatable by varying the gain of the beam pattern(s) of the one or more mechanically rotatable antennae.

According to a second aspect of the present invention there is provided a method for determining the position of a system comprising
- transmitting signals in a number of directions within a range of directions using a transmitter comprising a first rotatable antenna;
- receiving using a receiver echoes of the signals from any direction in the range; wherein the receiver comprises a second rotatable antenna, the first antenna being mechanically couplable to the second antenna; and
- processing the received echoes to derive echo data signals indicative of the distance of the system to one or more reflective surfaces and the direction of the one or more reflective surfaces relative to the system; wherein the step of processing comprises determining the position of the system relative to a starting position from the derived echo data signals indicative of the distance of the system to one or more of the one or more reflective surfaces and the direction of the one or more of the one or more reflective surfaces relative to the system.

In a preferred embodiment, the receiving step comprises receiving signals using one or more mechanically rotatable antennae each having an associated beam pattern gain associated with a beam pattern, the receiving step further comprising receiving signals using one or more electrically rotatable antennae by varying the gain of the beam pattern(s) of the one or more mechanically rotatable antennae.

In a further preferred embodiment, the transmitting step comprises transmitting signals from one or more mechanically rotatable antennae each having an associated beam pattern gain associated with a beam pattern, the transmitting step further comprising transmitting signals using one or more electrically rotatable antennae by varying the gain of the beam pattern(s) of the one or more mechanically rotatable antennae.

According to the invention, there is also provided an apparatus for determining its own position within a region having a plurality of planar RF-signal reflective boundaries, the apparatus comprising: a directional RF transceiver; an IR sensor; a rotation mechanism for rotating the RF transceiver and IR sensor though a series of angular positions within an angular range; and a processor arranged to receive (i) first data from the RF transceiver indicative of RF signals received by the RF transceiver at each of the angular positions and (ii) second data indicative of the IR radiation received by the IR sensor, and to perform a positioning algorithm using the first data to estimate the position of the apparatus within the region, the processor further being arranged to modify the positioning algorithm in dependence on the second data.

The processor may be arranged to identify a warm object and extract distance information from the second data, the distance information being indicative of the distance from the apparatus to the warm object.

The modification may include removing from the first data a component due to reflections from a human body at a distance from the system indicated by the distance information.

The positioning algorithm may include: (i) for each angular position, determining whether the first data indicates that the RF transceiver received a reflection from a boundary at that angular position, and (ii) for such angular positions, obtaining distance data indicating the distance of the boundary which caused the reflection, and (iii) using the distance data and the corresponding angular position, to estimate the position of the apparatus within the region. Step (i) of the positioning algorithm may include identifying peaks in the reflected signal which are above a first threshold, and the modification includes reducing the first threshold to a modified threshold in respect of angular positions for which the second data suggests that the received RF signals are partially blocked by a human body.

The modified threshold may be obtained based on the respective amplitudes of at least one component of the received signal at a plurality of angular positions for which the second data suggests that the received RF signals are partially blocked by a human body.

If the first data indicates that, in respect of a given angular position the received RF signals have an amplitude above the first threshold, the positioning algorithm may not be modified in respect of that angular position.

The processor may be arranged to modify the first data to increase the amplitudes of RF signals received by the RF transceiver with increasing echo delay.

The RF transceiver may comprise an RF transmitter antenna and a separate RF receiver antenna, at least one of the antennas being a directional antenna. Alternatively, the RF transceiver may comprise a single directional antenna which operates by time division as a transmitter antenna and as a receiving antenna. The RF transceiver may be arranged to emit UWB pulses.

According to the invention there is also provided a method for determining the position of an apparatus within a region having a plurality of RF-signal reflective boundaries, the apparatus comprising: a directional RF transceiver; an IR sensor; and a rotation mechanism for rotating the RF transceiver and IR sensor though a series of angular positions within an angular range; the method including performing a positioning algorithm performed on first data indicative of RF signals received by the RF transceiver at each of the angular positions, to estimate the position of the apparatus within the region, wherein the positioning algorithm is modified in dependence on second data indicative of the IR radiation received by the IR sensor, and to perform a positioning algorithm.

The method may include identifying a warm object and extracting distance information from the second data, the distance information being indicative of the distance from the apparatus to a warm object. The modification may include removing from the first data a component due to reflections from a human body at a distance from the system indicated by the distance information.

The positioning algorithm may include: (i) for each angular position, determining whether the first data indicates that the RF transceiver received a reflection from a boundary at that angular position, and (ii) for such angular positions, obtaining distance data indicating the distance of the boundary which caused the reflection, and (iii) using the distance data and the corresponding angular positions, to estimate the position of the apparatus within the region. Step (i) of the positioning algorithm may include identifying peaks in the reflected signal which are above a first threshold, and the modification includes reducing the first threshold to a modified threshold in respect of angular positions for which the second data suggests that the received RF signals are partially blocked by a human body.

The modified threshold may be obtained based on the respective amplitudes of at least one component of the received signal at a plurality of angular positions for which the second data suggests that the received RF signals are partially blocked by a human body.

If the first data indicates that, in respect of a given angular position the received RF signals have an amplitude above the first threshold, the positioning algorithm may not be modified in respect of that angular position.

The method may include modifying the first data to increase the amplitudes of RF signals received by the RF received with increasing echo delay.

The RF transceiver may transmit UWB pulses.

According to the invention, there is also provided a method of estimation of a direction of arrival of a signal using a directional antenna, the antenna having an axis which can be moved through a range of angles and having a maximum sensitivity to signals received parallel to said axis, the method including the steps of: (a) obtaining, for each of a plurality of angular positions $\theta_k$ of the axis of the said antenna, a respective signal strength sample value $p(\theta_k)$; (b) using the sample values $p(\theta_k)$ and/or the value of a gain function of the directional antenna at the corresponding angle $\theta_k$ to obtain, for each sample value, a respective weight value $w_k$; (c) obtaining indication values indicative of an estimate of the direction of arrival from a mathematical function including a respective logarithm value of each sample value, each said logarithm value being weighted in the mathematical function by the respective weight value.

The weight values $w_k$ may be proportional to the respective sample values. The weight value $w_k$ for each respective sample value may be equal to the sample value divided by the sum of the sample values.

The weight values may be proportional to the gain function $B(\theta_k - \theta_M)$ of the directional antenna at the corresponding angle $\theta_k$, where $\theta_M$ is the angle for which B is maximal.

Step (c) may include: (i) calculating the weighted average angle $$\overline{\theta}'_i = \frac{1}{i} \sum_{k=1}^{i} w_k \theta_k$$

and weighted average sample power in dB $$d\overline{p}'_i = \frac{1}{i} \sum_{k=1}^{i} w_k dp(\theta_k);$$

and (ii) obtaining said indication values $\hat{a}, \hat{b}, \hat{c}$ as given by:

$$\begin{bmatrix} \hat{a} \\ \hat{b} \\ \hat{c} \end{bmatrix} = (A'^T A')^{-1} A'^T Y'$$

where $$A' = \begin{bmatrix} \overline{\theta}'^2_1 \overline{\theta}'_1 1 \\ \overline{\theta}'^2_2 \overline{\theta}'_2 1 \\ \ldots \\ \overline{\theta}'^2_N \overline{\theta}'_N 1 \end{bmatrix}, \quad Y' = \begin{bmatrix} d\overline{p}'_1 \\ d\overline{p}'_2 \\ \ldots \\ d\overline{p}'_N \end{bmatrix},$$

said estimated direction being given by $$\hat{\theta}_0 = \frac{-\hat{b}}{2\hat{a}}.$$

According to the invention, there is also provided apparatus for estimating the direction of arrival of a signal, the apparatus comprising: a directional antenna, the antenna having an axis having a maximum sensitivity to signals received parallel to said axis; an actuator for moving the antenna through a range of angles; and a processor arranged to receive from the antenna, for each of a plurality of angular positions $\theta_k$ of the axis of the said antenna, a respective signal strength sample value $P(\theta_k)$; said processor being arranged to: (a) use the sample values $P(\theta_k)$ and/or the value of a gain function of the directional antenna at the corresponding angle $\theta_k$ to obtain, for each sample value, a respective weight value $w_k$; (b) obtain indication values indicative of an estimate of the direction of arrival from a mathematical function including a respective logarithm value of each sample value, each said logarithm value being weighted in the mathematical function by the respective weight value; and (c) obtain said estimate of the direction of arrival from said indication values.

The weight values $w_k$ may be proportional to the respective sample values. The weight value $w_k$ for each respective sample value may be equal to the sample value divided by the sum of the sample values.

The weight values may be proportional to the gain function $B(\theta_k - \theta_M)$ of the directional antenna at the corresponding angle $\theta_k$, where $\theta_M$ is the angle for which B is maximal.

The processor may be arranged to obtain the indication values by: (i) calculating the weighted average angle $$\overline{\theta}'_i = \frac{1}{i} \sum_{k=1}^{i} w_k \theta_k$$

and weighted average sample power in dB $$d\overline{p}'_i = \frac{1}{i} \sum_{k=1}^{i} w_k dp(\theta_k);$$

and (ii) obtaining said indication values $\hat{a}, \hat{b}, \hat{c}$ as given by:

$$\begin{bmatrix} \hat{a} \\ \hat{b} \\ \hat{c} \end{bmatrix} = (A'^T A')^{-1} A'^T Y'$$

where $$A' = \begin{bmatrix} \overline{\theta}'^2_1 \overline{\theta}'_1 1 \\ \overline{\theta}'^2_2 \overline{\theta}'_2 1 \\ \ldots \\ \overline{\theta}'^2_N \overline{\theta}'_N 1 \end{bmatrix}, \quad Y' = \begin{bmatrix} d\overline{p}'_1 \\ d\overline{p}'_2 \\ \ldots \\ d\overline{p}'_N \end{bmatrix},$$

the processor being arranged to obtain said estimated direction of arrival from the formula $$\hat{\theta}_0 = \frac{-\hat{b}}{2\hat{a}}.$$

According to the invention, there is also provided a positioning system including a direction estimation apparatus as described above, and further including a second processor for controlling the direction estimation apparatus to obtain a direction of arrival estimation for each of at least two received signals, and for using said at least two direction of arrival estimations to obtain an estimate of a location of the positioning system.

Features described in relation to one aspect of the invention may also be applicable to the other aspects of the invention.

BRIEF DESCRIPTION OF THE DRAWINGS

Preferred features of the invention will now be described, for the sake of illustration only, with reference to the following Figures in which:

FIG. 1b is a graph of the variation of amplitude and direction of the received reflection from a farthest object in a system including the directional antenna of FIG. 1a;

FIGS. 2a to 2h show a series of graphs of amplitude against time at various stages of processing of a received signal from system including the directional antenna of FIG. 1a;

FIG. 3 is a graph showing a Gaussian function of amplitude against direction obtained using a non-linear least-square fitting process and corresponding to a series of samples of processed received signals obtained from a system including the directional antenna of FIG. 1a;

DETAILED DESCRIPTION OF PREFERRED EMBODIMENTS

Embodiment 1

The method for determining a position of an object such as a robot according to a first embodiment of the invention will be described in connection with FIGS. 1a to 9 and comprises two basic steps. The first step is a distance measurement and direction determination step and is illustrated with reference to FIGS. 1a to 3. The second step is a position determination step and is illustrated with reference to FIGS. 5 to 9. A positioning system for determining the position of an object according to a first embodiment of the invention is illustrated in FIG. 4.

Figure 1A:
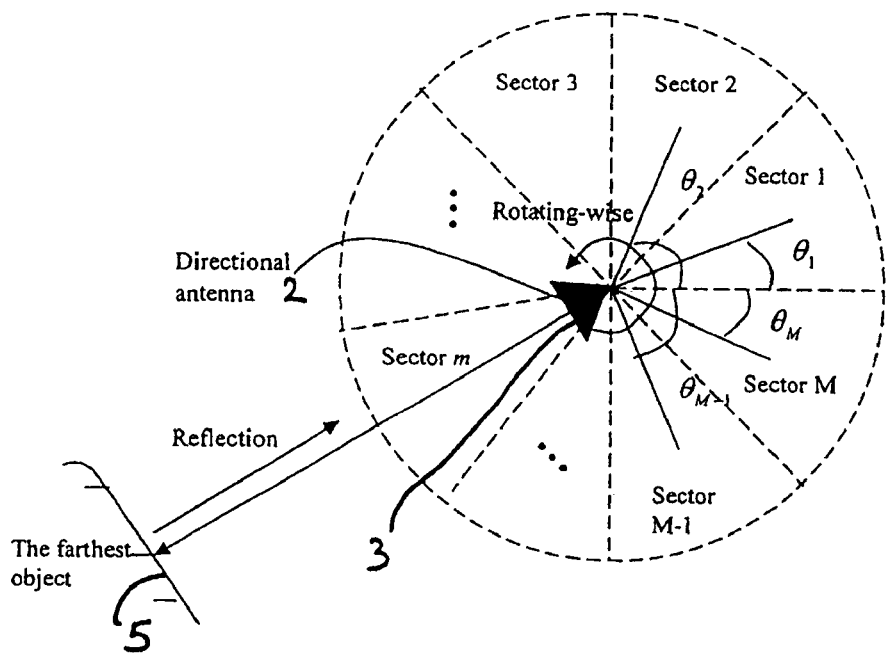
FIG. 1a is a schematic diagram showing a directional antenna and its sectors of rotation according to an embodiment of the invention.

FIG. 1a shows a positioning system according to a first embodiment which comprises a transmitter (not shown) coupled to a first rotating antenna 2 which is able to rotate a full 360 degrees in a substantially horizontal plane. The transmitter transmits bursts of signals, for example, ultrawide band (UWB) pulses, which are reflected back to a second rotating antenna 3. The second rotating antenna 3 is mechanically coupled to the first rotating antenna 2 and the output of the second rotating antenna 3 is electrically coupled to a receiver (not shown). The circle of rotation of the antennae 2, 3 may be considered to be divided into M sectors. In FIG. 1a, a farthest object 5 is located in sector m.

Figure 1B:
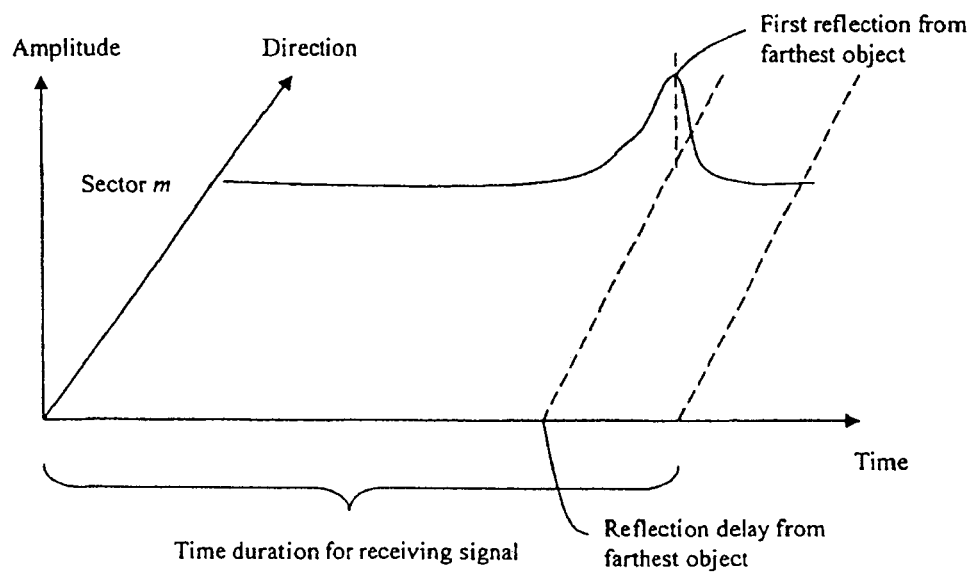

FIG. 1b shows the amplitude of the signal reflected back from the farthest object 5 which is in sector m and received at the receiver.

In use, the antennae 2, 3 rotate through 360 degrees and in so doing take M samples. Each sample consists of firing a pulse and processing the reflected signals. Thus there are M sampling angles $\theta_1$ to $\theta_M$. Thus, at sampling angle $\theta_m$, the directional antennae will cover the range covered by sector m. After each pulse is transmitted, the waveform corresponding to the received signal is recorded for an interval sufficient to recover the main reflection from the farthest object in the working area.

Figure 2A:
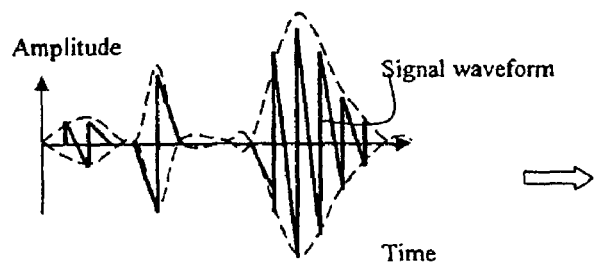
Figure 2B:
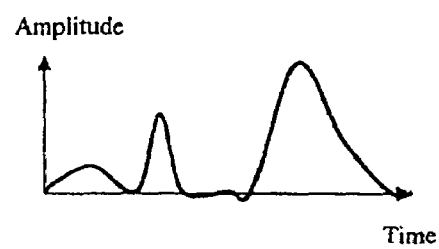

In the directional antenna system shown in FIG. 1a, the received signal from a transmitted pulse may be, for example, as shown in FIG. 2a and, for each sample, the envelope of the received waveform is detected, as shown in FIG. 2b.

Figure 2C:
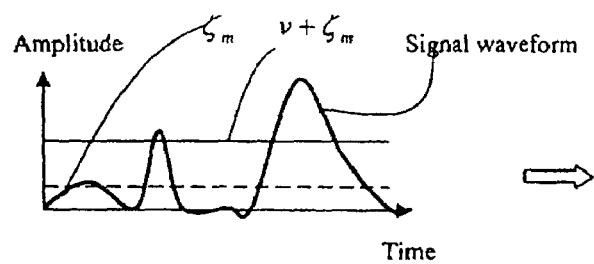

The average value of the waveform in each sector is calculated, as shown in FIG. 2c. The average value of the waveform in sector m is $\xi_m$. A threshold value, "v" (where 0<v) is then set, as shown in FIG. 2c.

Figure 2D:
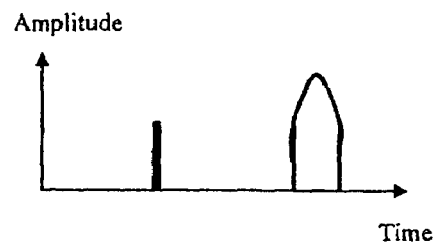

The signal is then passed to a slicing stage where it is sliced at a level v+$\xi_m$. Where the signal is below this slicing level, the output of the stage is zero. Where the input signal exceeds the slicing level, the output of the stage is equal to the input signal level. The output of the stage is shown in FIG. 2d for sector m.

Figure 2E:
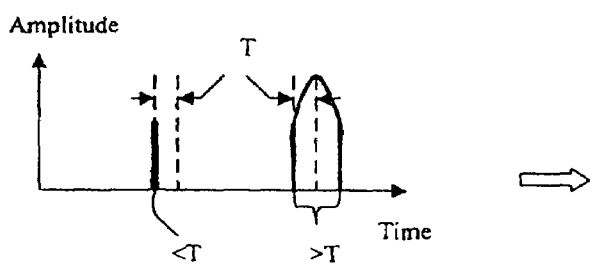
Figure 2F:
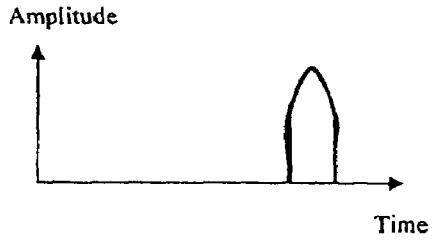

The output of the slicing stage is then passed to a pulse width filtering stage in which the sliced signal is pulse width filtered, that is, a time threshold T is set, as shown in FIG. 2e. If the non-zero signal in the sliced waveform is less that T in width, the output of this stage is zero. However, if the width of the pulse is greater than T, the output of this stage will be equal to the input signal of this stage, as shown in FIG. 2f for sector m. The resulting waveforms are stored.

Figure 2G:
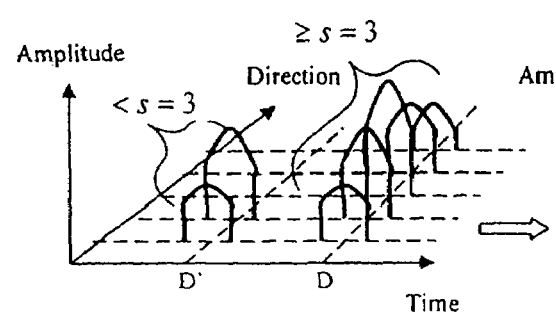
Figure 2H:
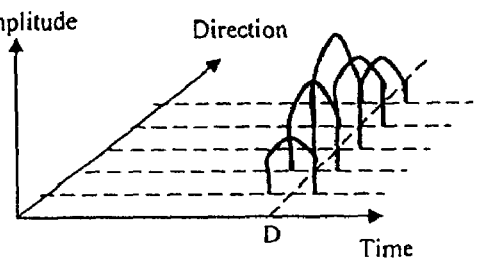

After the antennae have completed a full revolution, there will M sample waveforms stored, as shown in FIG. 2g which illustrates the amplitudes of the stored waveforms over time, the time axis in FIG. 2g corresponding to the time after each pulse is transmitted, rather than real time. The stored waveforms are then filtered in the space domain in a space domain filtering stage. A space domain threshold "s", where 0<s, is set for the stored waveforms. If at any time point along the time axis, the signal amplitudes in K neighbouring sectors (which are continual locations along the space axis) are larger than zero, and K>s, the output of the space filtering stage at this point in the K sectors will be equal to their input values. Otherwise, their output is set to zero. FIGS. 2g and 2h illustrate this for a case where s is equal to 3.

The next stage is to determine the distance and direction of each major reflection. As the distances from major objects to the antennae 2, 3 will vary from one to another, there is one maximum signal in each sector. The point τ along the time axis at which the maximum signal occurs is the time taken from transmission of the pulse until the signal is received back at the receiver, taking the instant of transmission as zero. The distance d from the object to the positioning device is given by d=cτ/2, where c is the speed of light.

Figure 3:
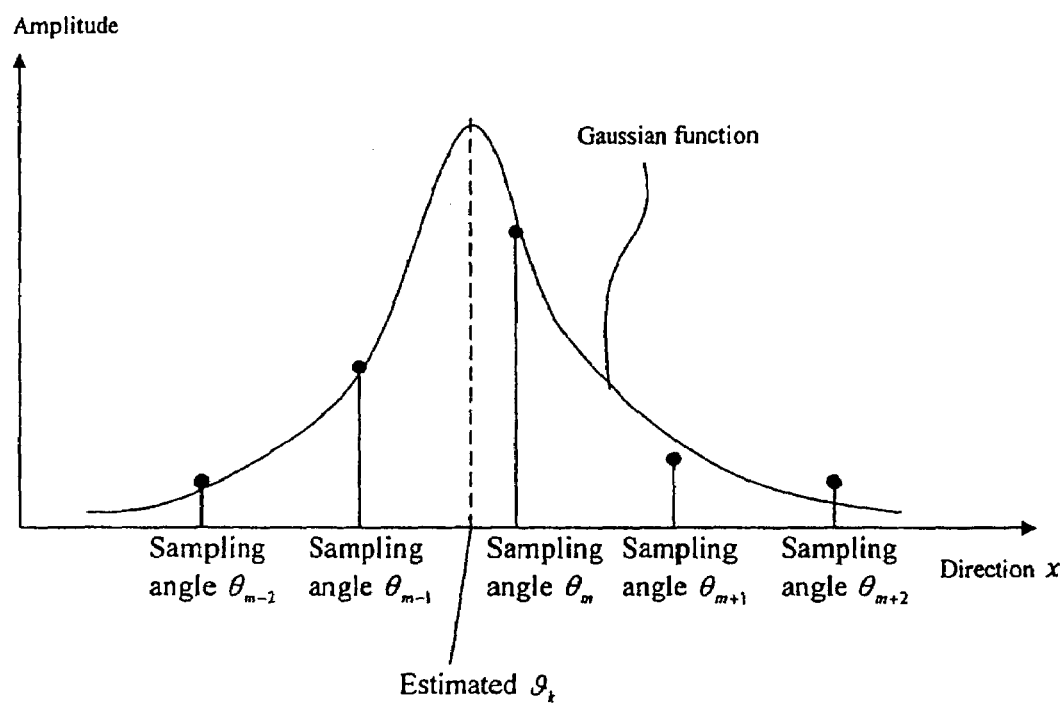
Figure 4:
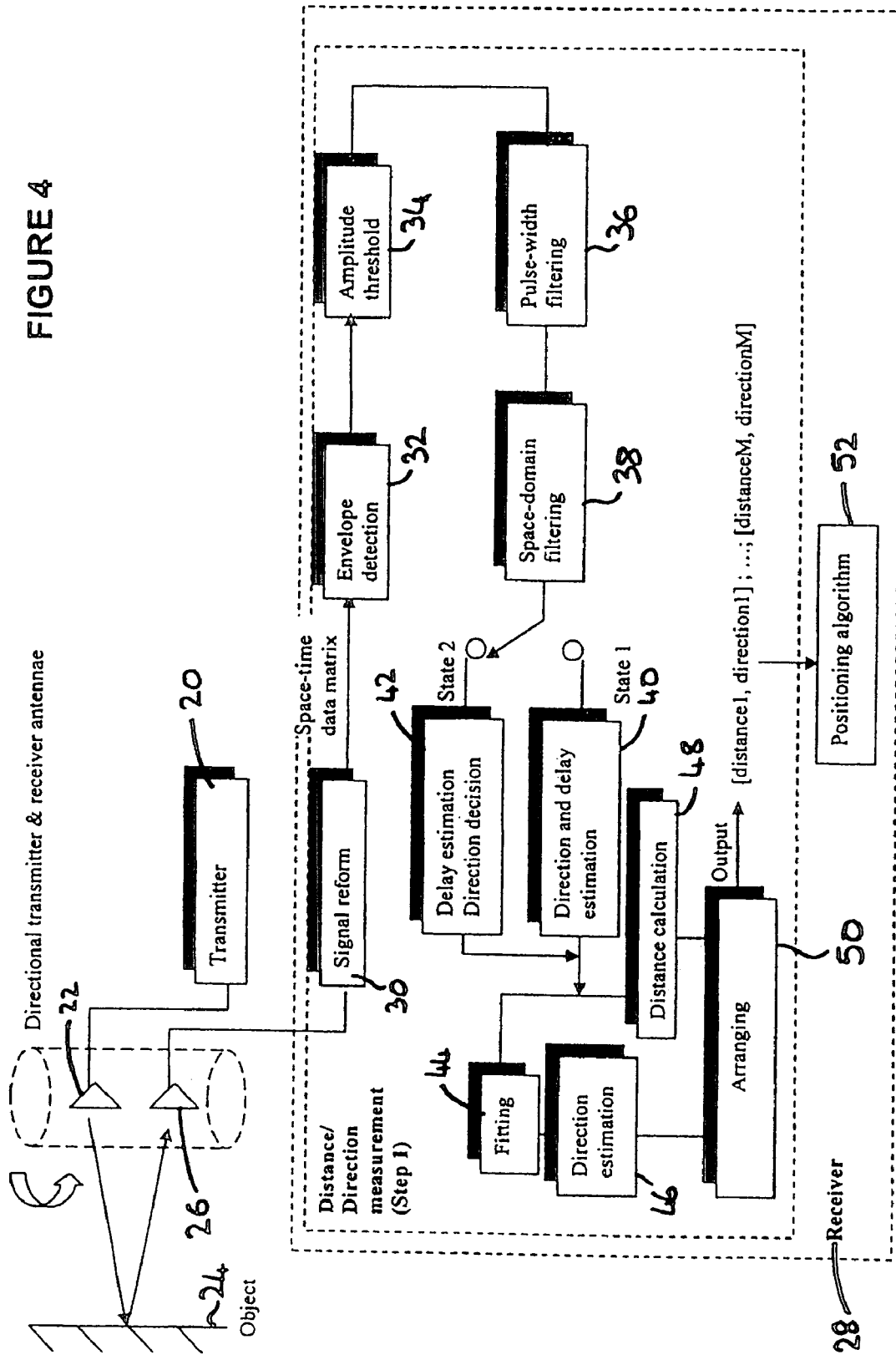
FIG. 4 is a block schematic diagram of a positioning device according to an embodiment of the invention.

FIG. 3 shows a graph of a Gaussian function of amplitude against direction obtained using a non-linear least-square fitting process and corresponding to a series of samples of processed received signals obtained from a system including the directional antenna of FIG. 1a. To determine the direction of the object from which the transmitted signal is being reflected, the reflected signal corresponding to a group of signals in the space-time domain, the sector containing the maximum signal is selected together with its neighbouring sectors which contain a corresponding signal. P neighbouring sectors are taken which occur before the maximum and P sectors are taken which occur after the maximum, where P should be as large as possible, but 2P+1≦K.

The central angle of the sector which contains the maximum is denoted as $\theta_m$, as shown in FIG. 1, and the central angles of the samples being considered are denoted by $\theta_{m-p}$ to $\theta_{m+p}$.

The direction of the object may be determined by determining the Gaussian function which best fits the distribution of the amplitudes of the reflections from the object. The Gaussian function may be determined using a non-linear least square fitting technique. The nonlinear least-square fitting is a well-known technique, which can be checked on the website, for example, http://mathworld.wolfram.com/NonlinearLeastSquaresFitting.html. FIG. 3 shows an example of fitting the Gaussian function to the amplitudes. In another embodiment, to reduce the fitting complexity, a conventional polynomial fitting technique may be used instead of a non-linear least-square fitting technique.

The estimated angular direction of the object with respect to the origin of the sectors corresponds to the peak of the Gaussian function and is denoted by the angle $\Theta_k$ (where k means the kth reflection), as shown in FIG. 3.

Other methods are also possible for determining the direction.

FIG. 4 is a block schematic diagram of a positioning device according to a preferred embodiment of the invention. The device comprises a transmitter 20 which generates pulses which are passed to a directional transmitting antenna 22. The pulses transmitted from the antenna 22 strike an object 24 and are reflected back to a directional receiving antenna 26. The signals from the directional receiving antenna 26 are passed to a receiver 28 where they are recovered in a signal reform stage 30. The output of the signal reform stage 30 is passed to an envelope detection stage 32. The output of the envelope detection stage 32 is connected to the input of an amplitude threshold stage 34. In the amplitude threshold stage 34, the average level of the signal in a particular sector is determined and is added to a predetermined threshold level. The combined level is then compared with the incoming signal from the envelope detection stage 32. The signals exceeding the combined threshold are then passed to a pulse width filtering stage 36. In the pulse width filtering stage 36, the pulses from the amplitude threshold stage 34 are compared with a predetermined pulse width T and pulses narrower than T are rejected.

The output of the pulse width filtering stage 36 is passed to a space domain filtering stage 38 where the pulses in a given sector are compared with pulses in neighbouring sectors. The output of the space domain filtering stage 38 depending on whether or not the system is in a first state or a second state, passes to a direction and delay estimation stage 40 if in state 1 or to a delay estimation and direction decision stage 42 if in state 2. States 1 and 2 are explained in more detail below.

The outputs of whichever of the direction and delay estimation stage 40 or the delay estimation and direction decision stage 42 is active is passed to a curve fitting stage 44. The output of the curve fitting stage 44 is passed to a direction estimation stage 46. In addition, the output of the direction and delay estimation stage 40 or the delay estimation and direction decision stage 42, is passed to a distance calculation stage 48. The estimated direction data and the calculated distance data are passed to an arranging stage 50 where the distance and direction data for each object are grouped in sequence. This data is then passed to a positioning algorithm stage 52 in which the position of the device is calculated.

When the system is operating in state 1, for example, when the antenna system is at the origin, the directions and delays of all major reflections detected in one rotation of the antenna system, are estimated and recorded. The estimated direction will be taken from the output of the space domain filtering stage 38, that is, from reflections currently obtained.

If, however, the system is operating in "state 2", that is, the delay is estimated and recorded but the direction is only estimated, the positioning algorithm stage 52 will select a direction from several known directions as the determined direction. These known directions are directions which have already been estimated at the origin. The decision criterion is preferably denotable by, but is not limited to, the expression:

$$\text{direction} = \text{arc}_k \min |\hat{\Theta}_k - \Theta_k|$$

where $\hat{\Theta}$ is the direction estimation result at the current location, and $\Theta_k$ with various values of k denotes the directions which have already been estimated at origin.

When the system is operating in state 2, the major reflections are estimated but only reflections whose direction has not changed from the previous position are used to calculate the new position. If there are no reflections whose state has not changed, then the system operates in state 1.

Occasionally, there are several maximum values in one non-zero range of the space-time domain, which means that there are several objects in different directions around the device having almost the same distance to the device. In this case, there may be several maximum values found. The corresponding direction of each reflection found is estimated using a non-linear least square fitting technique with the same Gaussian function described above.

Using the above procedure, the major reflections around the positioning device may be determined, and the distances and directions of the reflecting object from the positioning device may also be determined. From these, the position of the positioning device may be determined.

In a preferred embodiment of the system of FIG. 4, one or more of the envelope detection stage 32, the amplitude threshold stage 34, the pulse width filtering stage 36, the space domain filtering stage 38, the direction and delay estimation stage 40, the delay estimation and direction decision stage 42, the curve fitting stage 44, the direction estimation stage 46, distance calculation stage 48, the arranging stage 50 and the positioning algorithm stage 52 may be implemented by hardware and/or software in a processor.

Two methods of determining the position of the positioning device are proposed, according to preferred embodiments of the invention. A first preferred method may be used where the layout of the positioning area is unknown but it is known to be a convex polygon totally enclosing the positioning area, such as a triangle, a rectangle, or a pentagon, for example. A second preferred method may be used where the layout of the positioning area is unknown and it is not a convex polygon.

With regard to the first method, initially the positioning device is located in the centre of the positioning area, which may be regarded as the origin, so that each side of the polygon will cause a reflection to the device.

The positioning device may be oriented with a compass. Using the procedures outlined above, distance and/or direction estimation values of the reflections may be obtained from all sides of the polygon. These values are stored then in the device.

Figure 5:
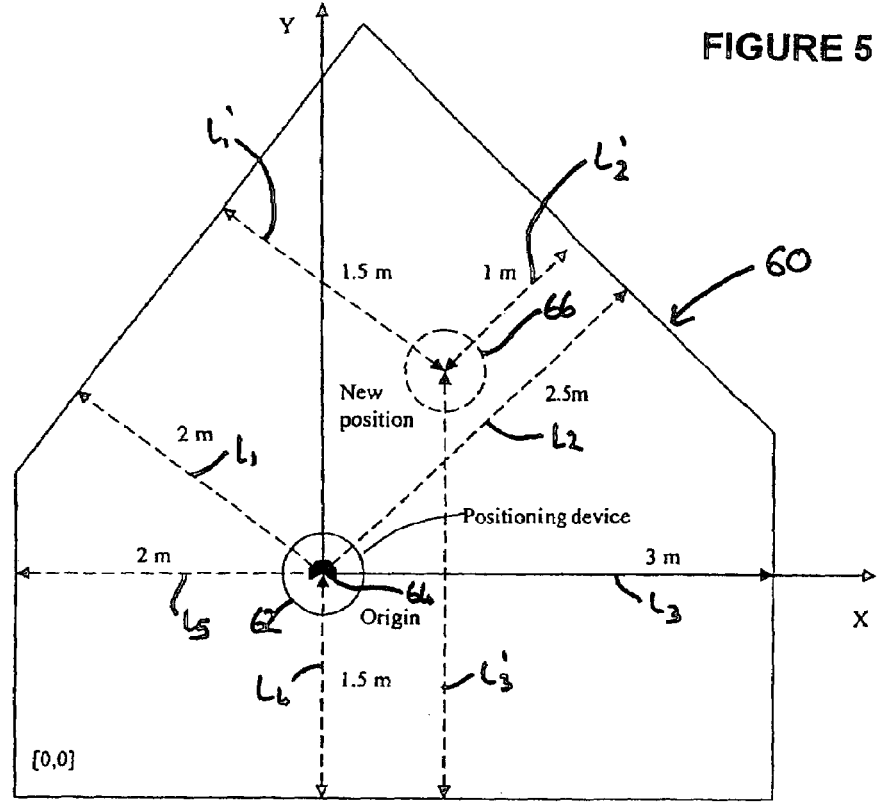
FIG. 5 is a plan view of a working area showing a positioning device according to an embodiment of the invention at its origin and at a new position.

FIG. 5 shows a pentagonal positioning area 60 and a positioning device 62 located therein currently situated in a position defined as the origin 64. The various distances of the positioning device 62 from the sides of the positioning area 60 are denoted by $l_1$, $l_2$, $l_3$, $l_4$ and $l_5$. An X-Y system of co-ordinates may be defined with its origin [0,0] at a current location and direction, that is the centre of the positioning area, as shown in FIG. 5.

When the positioning device moves to a new location 66 in the positioning area 60, as shown in FIG. 5, the directions of the sides of the positioning area from which the reflections are sent and return and the distances $l_1$, $l_2$, $l_3$, $l_4$ and $l_5$.from the sides of the polygonal positioning area to the positioning device are recalculated. The results are then examined to determine which of the reflections from the sides of the polygon have the same directions as found at the origin. The distance and direction information of two of the reflections may be used to calculate the X and Y values of the new location (X' and Y').

Figure 6:
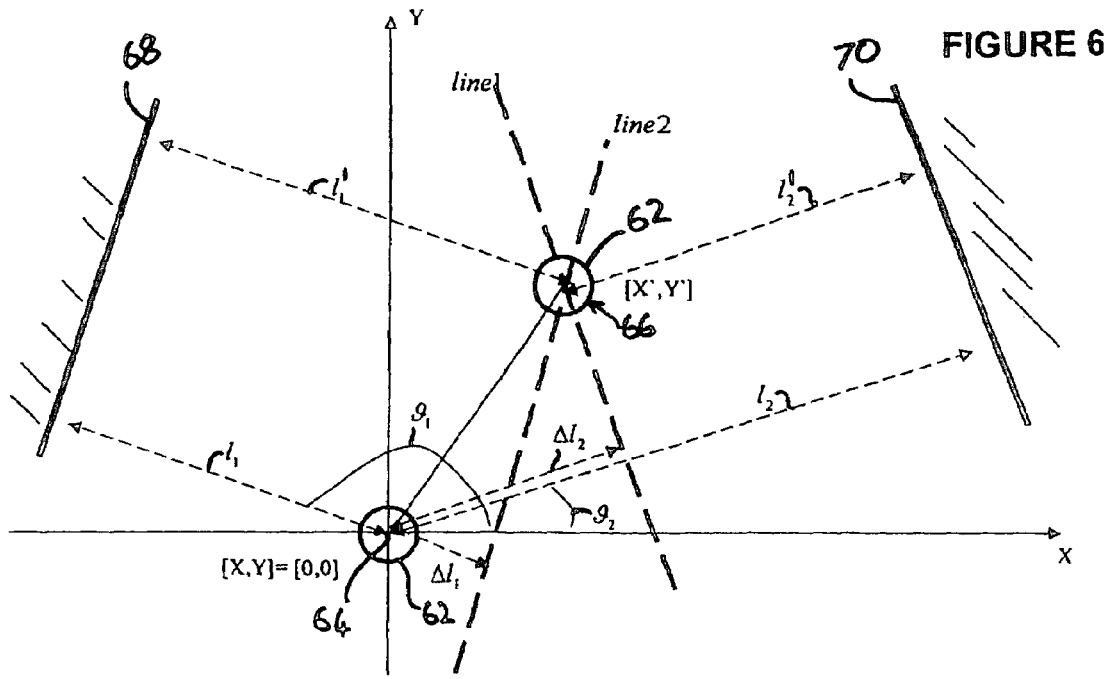
FIG. 6 is an enlarged plan view of a part of FIG. 5 showing the positioning device according to an embodiment of the invention at its origin and at a new position.

FIG. 6 shows the origin 64 and the new position 66 of the positioning device 62 together with two sides 68, 70 of the positioning area 60, the reflections from which are used to calculate the new position 66 of the positioning device.

In FIG. 6, $\Theta_1$, is the angle between a line passing through the origin and normal to side 68, and the x-axis; $\Theta_2$ is angle between line passing through the origin and normal to the side 70 and the x-axis; $l_1'$ is the distance from side 68 to the new position 66, and $l_2'$ is the distance from side 70 to the new position 66. As the distances and directions for the two reflections from the sides 68 and 70 are known, $\Theta_1$, $\Theta_2$, $l_1$, $l_1'$, $l_2$, $l_2'$ are known. Hence, the change in $l_1$ may be denoted as $\Delta l_1 = l_1' - l_1$. Similarly, the change in $l_2$ may be denoted as $\Delta l_2 = l_2' - l_2$.

Two lines line1 and line2 may be defined as follows where line1 is substantially parallel to side 70 and line2 is substantially parallel to side 68:

$$line1: Y=\tan(\Theta_1-\pi/2)X-\Delta l_1/\sin(\Theta_1-\pi/2) \tag{1}$$

$$line2: Y=\tan(\Theta_2+\pi/2)X+\Delta l_2/\sin(\Theta_2+\pi/2) \tag{2}$$

These two lines intersect at the new location 66 of the positioning device 62. The position of the new location 66 is the point of intersection of line1 and line2. Thus, X' and Y' are solutions to the above two linear equations.

FIG. 7 again shows a section of the positioning area 60 including the origin 64, the new position 66 and the two sides 68, 70 of the positioning area which are being used to determine the position of the positioning device 62.

Figure 7:
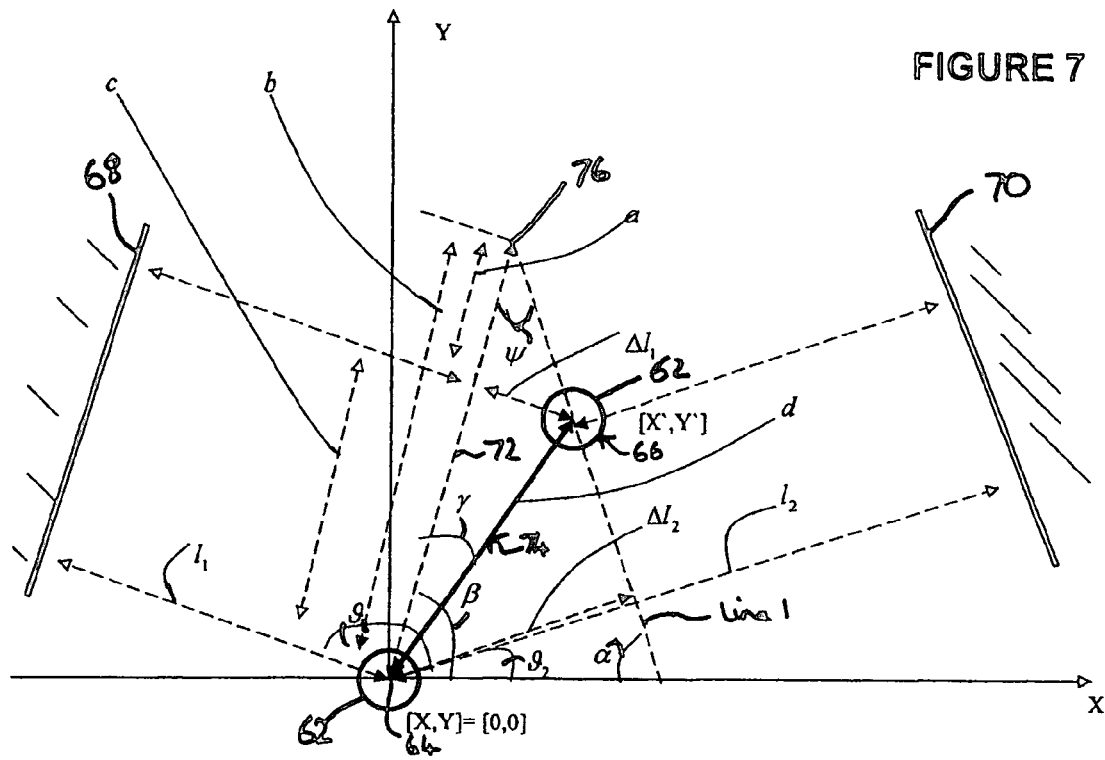
FIG. 7 is an enlarged plan view of a part of FIG. 5 showing the positioning device according to an embodiment of the invention at its origin and at a new position and showing construction lines for calculating the new position from the origin.

In FIG. 7, the angle α is the angle made by line1 through the new position 66 to the x axis. The angle β is the angle between a line 72 parallel to side 68 passing through the origin 64. The angle γ is the angle between the line 72 parallel to side 68 passing through the origin 64 and a line 74 joining the origin 64 to the new position 66. The angle ψ is the angle between line1 and line 72. The distance between a line normal to line 68 passing through the new position 62 and the intersection of line1 and line 72 is denoted as the distance a; distance b is the distance from the origin 64 to the intersection 76 of line1 and line 72; distance c is the distance between the origin 64 and a line normal to side 68 passing through the new position 66; and distance d is the distance between the origin 64 and the new position 62.

The angles and distances may be calculated as follows $$\beta=\Theta_1-\pi/2, \tag{3}$$

$$\alpha=\pi/2-\Theta_2, \tag{4}$$

$$\psi=\pi-\beta-\alpha=\pi-(\Theta_2-\Theta_1). \tag{5}$$

$$a=\Delta l_1/\tan\psi, \tag{6}$$

$$b=\Delta l_2/\cos\psi, \tag{7}$$

$$c=b-a=\Delta l_2/\cos\psi-\Delta l_1/\tan\psi, \tag{8}$$

$$\gamma=\arctan\frac{\Delta l_1}{c}, \tag{9}$$

$$d=\sqrt{c^2+\Delta l_1^2}. \tag{10}$$

and the co-ordinates of the new position 66 may be calculates as follows:

$$X'=d\sin(\beta-\gamma) \text{ and } Y'=d\cos(\beta-\gamma) \tag{11}$$

Figure 8:
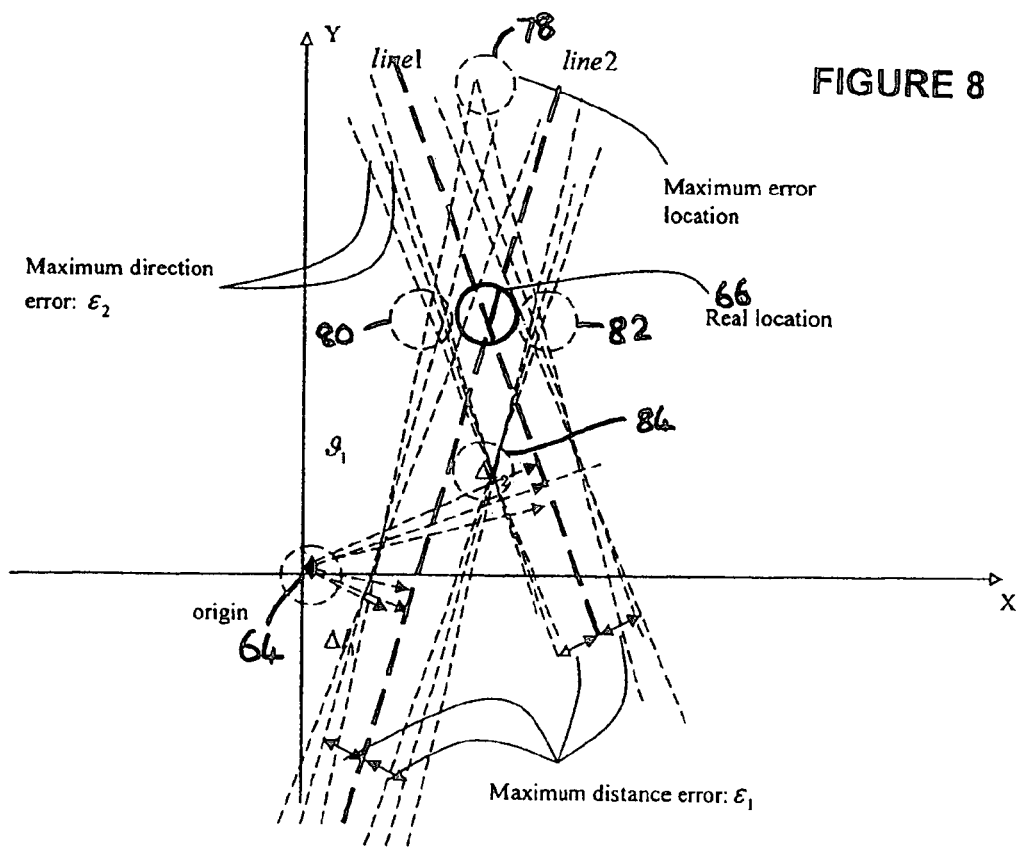
FIG. 8 is a schematic view of the system of FIG. 7 illustrating the effects of distance and direction errors.

The effects of errors in distance and direction on the accuracy of the positioning of the positioning device, are illustrated in FIG. 8. In FIG. 8, four positions 78, 80, 82 and 84 show the extreme positions (maximum and minimum) corresponding to the maximum errors in distance and direction.

The maximum error for distance measurement is denoted by $\epsilon_1$ and the maximum error for direction estimation is $\epsilon_2$. The real angle between the two reflecting sides 68, 70 is given by $\pi-(\Theta_1-\Theta_2)$. The distance from the maximum error location to the real location may be given by:

$$d_e = \lfloor(\epsilon_1 + \sqrt{X'^2 + Y'^2} \tan \epsilon_2)\cos \epsilon_2\rfloor / \sin(\pi - (\Theta_1 - \Theta_2) - 2\epsilon_2) \quad (12)$$

$d_e$ is associated with the distance from the new position to the origin.

If it is assumed that the angle between the two reflecting sides 68, 70 is $\geq \pi/4$, it may be possible to detect a number of reflections at one location, and a couple of reflections which satisfy the requirements may be found easily. Numerically, in a preferred embodiment, the radius of the positioning area may be around 3 m, the maximum error for distance measurement may be around 0.1 m, and the direction error may be around $\pi/180$. The maximum error should be smaller than $$d_e[(0.1 + 3 \cdot \tan(\tfrac{\pi}{180}))\cos(\tfrac{\pi}{180})] / \sin[(\tfrac{\pi}{4} - 2\epsilon_2)/2] = 0.279 \text{m}$$

Preferably, the X and Y errors, that is the distances from the true new position 66 to the extreme error positions, 78, 80, 82 and 84 are smaller than $d_e$.

Other reflections, which satisfy the angle requirement, that is, where the angle between the two reflecting sides 68 and 70 is $\geq \pi/4$, may be processed in a similar manner to calculate X' and Y' which are the co-ordinates of the new position 66. The corresponding values of X' and Y' may be averaged for all pairs of these reflections.

Note that the direction estimation is only performed at the origin ("state 1" in FIG. 4). When the positioning device moves to a new position, it is only necessary to determine which side the reflection is from ("state 2" in FIG. 4) as this may assist in avoiding accumulated errors.

When the positioning device moves from the origin to a new position, the reflections from some sides may disappear and this may be due either to the beam being blocked or the angle being such that the reflected beam is not returned to the device. However, other reflections received will guarantee the positioning output. Therefore, the system is capable of overcoming the blocking effect in some situations.

Figure 9:
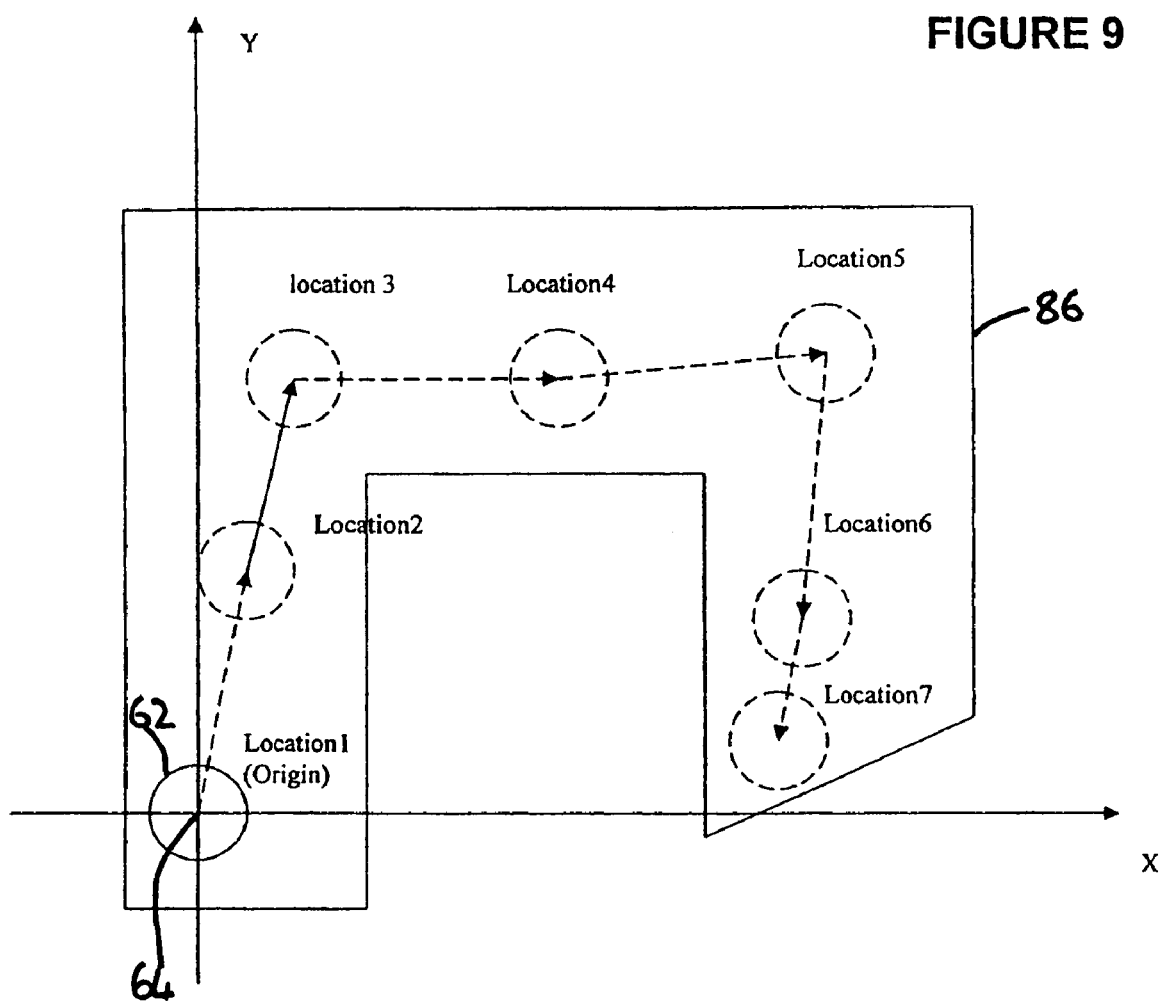
FIG. 9 is a plan view of an irregular positioning area for use with an embodiment of the invention.

FIG. 9 illustrates the alternative method of operating the system in which there is no defined polygon around the positioning area to provide regular reflections. In FIG. 9, the positioning area 86 is shown together with a series of locations 1 to 7 as the positioning device progresses around the area. Location 1 is the origin 64.

In this situation, it is possible that none of the reflections received at some of the locations will have the same direction as one of reflections at the origin 64. The position must therefore be determined step-by-step, that is, the current position is determined by the position of the last location and the direction and distance differences between this locations and the current location (for example, location 1 and location 7 in FIG. 9).

For example, if the device 62 moves from location 1 to location 2 to location 3 to location 4 ... to location 7 in sequence as shown, the first position (location 1) will be fixed as the origin. Distance and direction estimations from all surrounding objects will be determined (state 1) and the values recorded. The x and y axes are defined at this point. Based on the location of the start point, it is possible to build a 2D-axis (X-Y) system.

As the device moves, distance and direction estimations are made periodically. Note that the state in FIG. 4 is always "state 1". It may be assumed that the sampling locations are sufficiently close together so that most of the reflection parameters (directions and distances) do not change suddenly (mutation) as compared with the last result, that is to say there is no mutation.

When the device is moved to a new sampling location, it first scans around to obtain information on all the reflections it receives. From this information, it calculates the increases $\Delta X$ and $\Delta Y$ between the new and last location using the reflections which have the same direction as that in last sampling location.

For example, if the co-ordinates of the last position are denoted by [X,Y], then the co-ordinates of the new position are $[X',Y']=[X+\Delta X, Y+\Delta Y]$. The remaining reflections, which have different directions from those detected at the last sampling location, are considered as mutations and are not used at this location. The mutations may be caused by irregular objects or blocking by human beings. Information on all reflections received is recorded for possible use at the next location. The above procedure is performed at each location as the device continues to move.

Embodiment 2

Figure 10:
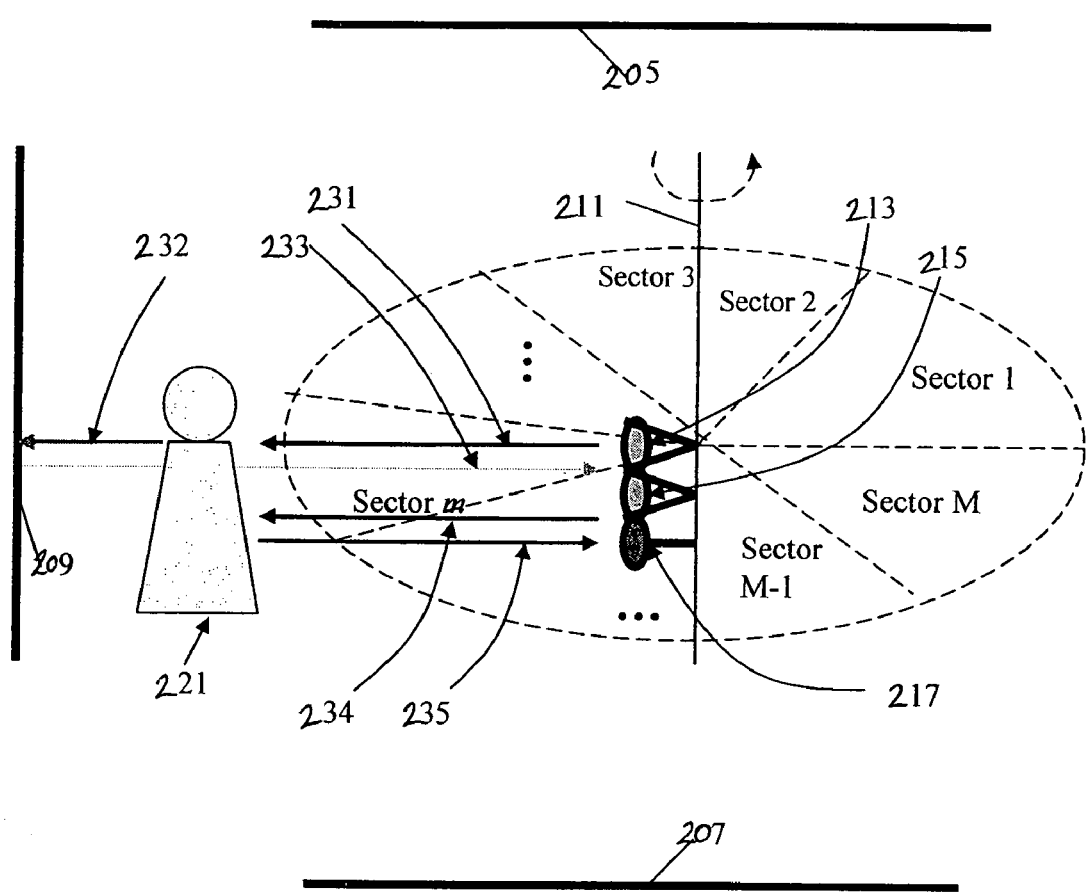
FIG. 10 illustrates schematically the operation of a system which is an embodiment of the present invention.

Referring firstly to FIG. 10, an apparatus which is an embodiment of the invention is illustrated schematically. The apparatus includes a RF transmitter antenna 213 (which can be a UWB transmitter) for transmitting signals, and an RF receiver antenna 215 for receiving the signals. At least one, and typically both, of the transmitter antenna 213 and receiver antenna 215, are directional.

If both are directional, the transmitter antenna 213 and receiver antenna 215 are both rotated in sync together around a vertical axis 211, through a 360 angular range. In this case, the antennas 213, 215 may be mechanically coupled to each other (e.g. formed as a one-piece unit), with their respective axes aligned. If only one is directional, then that one directional antenna is rotated, and the other may be either rotated or not. Optionally, the apparatus includes a direction finding device (e.g. a compass) for calibrating the angular position of the antennas 213 and/or 215 to some absolute direction.

In either case, the transmitter antenna 213 and the receiver antenna 215 can thus be considered here as a single directional RF transceiver, having a single direction (within the angular range) of maximum transmission amplitude/reception sensitivity. The term "directional transceiver" is also used in this document to cover a case in which a single directional antenna plays the role of both the antennas 213, 215.

The angular range is partitioned into M sectors, each centered on a respective angular position. In each of these sectors the apparatus transmits a signal using the transmitter antenna 213, and receives a reflected signal using the receiver antenna 215. Typically, the transmitted signal is a single UWB pulse, and this pulse is transmitted in only one direction within the sector. (Alternatively, the pulse may be transmitted multiple times, and the corresponding received signals averaged).

The apparatus further includes a directional IR sensor 217, which is rotated together with the directional antenna(s) 213, 215, so that the IR sensor 217 is always parallel to the transmission/reception direction of the directional antenna(s). (Note that, in principle, the IR sensor could be scanned through the angular range slightly in advance of, or slightly behind, the RF transceiver, provided that the difference between the time that the RF transceiver and the IR sensor 217 are directed at a given sector is less than the typical time taken by a human body to move in or out of that sector).

The IR sensor 217 can detect a warm object (i.e. a body having a temperature higher its surroundings, e.g. by a certain temperature detection threshold) such as human body, and determinate the distance of the apparatus from the warm object. The apparatus generally further includes a processor (e.g. one or more micro-processing devices) arranged (e.g. programmed) to find the position of the apparatus within an environment, based on the signals received by the antenna 215 and the IR sensor 217, as described below.

Let us assume that, as illustrated in FIG. 10, the apparatus is within an environment including walls 205, 207, 209. In this case, when the directional antenna(s) are directed successively towards the walls 205, 207, the RF signals will be transmitted from the transmitter antenna 213, reflected from the wall 205 or 207, and received by the receiver antenna 215. At these times the IR sensor 217 does not detect the presence of a human body, and the apparatus accordingly performs a positioning algorithm, in the manner illustrated in FIG. 5.

Figure 11A:
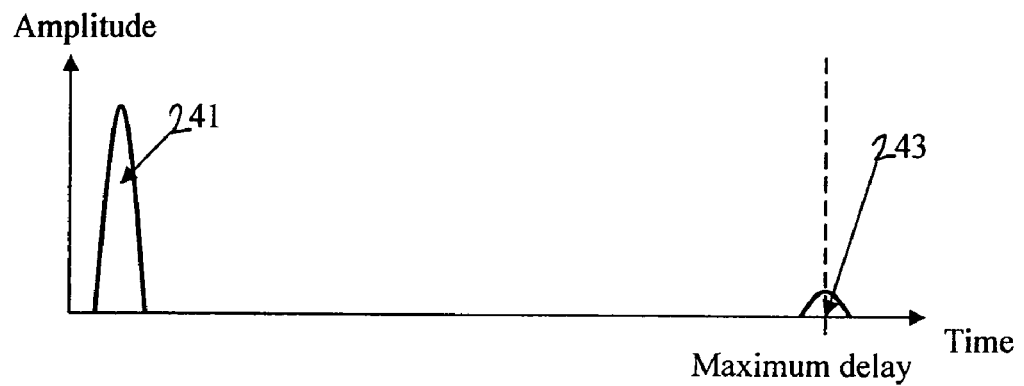
FIG. 11 illustrates how, in the embodiment of FIG. 10, there is compensation of the amplitude of a received UWB signal in relation to its echo delay time.
Figure 11B:
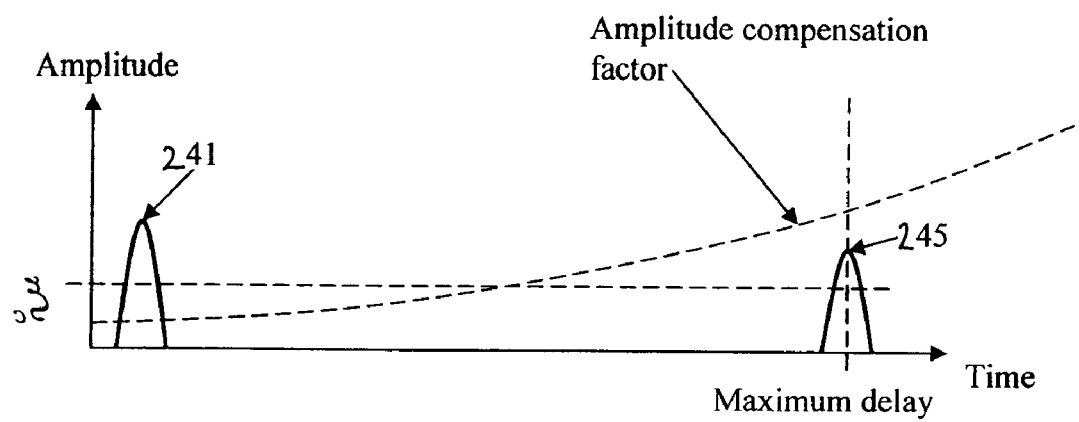

FIG. 11 (a) illustrates the amplitude of the signal picked up by the receiver antenna 215 as a function of time when the antennas 213, 215 are directed at one of the walls 205 or 207. It has two peaks: a first peak 241 indicating the received direct-path signal from the transmitter to the receiver, and a second later peak 243 indicating the signal reflected from the wall 205 or 207. Note that there may be other peaks between these two, due to reflections from other objects (not shown in FIG. 10) between the apparatus and the wall, but these peaks are neglected. The peak 243 is the peak received with the maximum delay, indicating that it is the furthest object in the environment.

Naturally, the peak 243 is lower according to the distance of the apparatus from the wall 205, 207. The received signal strength is compensated for this by multiplying it by a compensation factor which depends upon the distance along the time axis. The compensation factor is the inverse of the distance attenuation (assuming that the attenuation constant for UWB signal propagation in the space is known by pre-investigation). The product of the peak 243 and the compensation factor is illustrated as the peak 245. After compensation, the reflection signal strength of the peak 245 is independent of the distance between the apparatus and the wall 205 or 207, and related only to the absorption and blocking from the objects.

In dealing with sectors where the IR sensor 217 does not detect a human body, the apparatus employs a threshold $\xi_c$ (here referred to as the common threshold). Any received signal with a peak amplitude lower than this threshold is neglected. The threshold $\xi_c$ can be determined as $$\xi_c = \alpha(A_p - A_m) + A_m \quad (13)$$

where $A_p$ is the maximum signal amplitude (after strength compensation) in all sectors and during one complete rotation of the antennas, $A_m$ is the average signal amplitude in all sectors and all time (after strength compensation), and $\alpha$ is a constant ($0 \leq \alpha \leq 1$).

However, referring again to FIG. 10, when the directional antenna(s) are directed to the sector m (where m is an integer in the range 1 to M) which contains the normal direction to a wall 207, the IR sensor 217 detects the presence of a human body 221. The transmitted RF signal 231 intersects with the human body 221, and only a small proportion of RF signal 231 propagates through the body 221, and continues as beam 232. This beam 232, once reflected from the wall 209, again encounters the human body 221, and only a small proportion of the beam passes through the human body 221, to propagate as the beam 233 towards the receiver 215.

We now turn to the positioning algorithm performed in the case that the IR sensor 217 has detected a warm object in the sector m. Note that it is possible for the IR sensor 217 to detect the presence of a warm object without that object being a human body 221. To distinguish a human body from that of other warm objects, the received UWB signal is continuously monitored. A human body absorbs most of UWB signal, and also blocks most of the energy of the UWB reflection from the wall 209. Thus, if there is a human body 221 in this direction, the received UWB reflection signal 233 will be very weak, and typically smaller than the common case threshold.

The embodiment assumes that there is a human body 221 blocking reflections in this direction whenever the IR sensor 217 detects a warm object and the amplitude of the reflection is smaller than the common threshold $\xi_c$.

Figure 12:
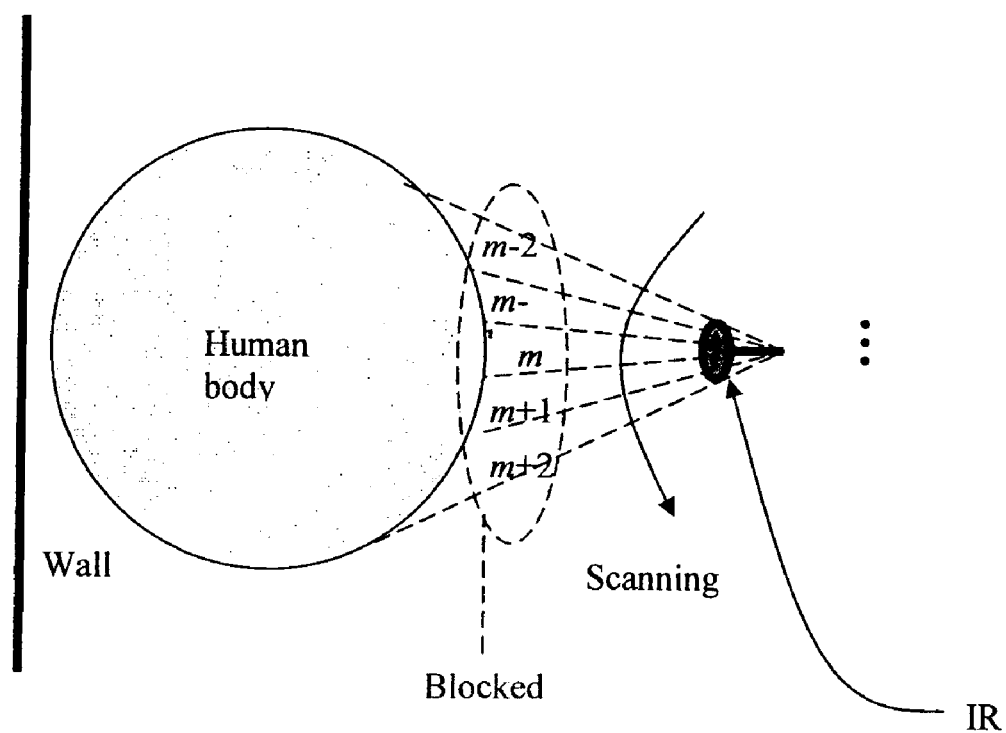
FIG. 12 illustrates schematically a situation in which, in the embodiment of FIG. 10, a human body blocks a plurality of angular sectors.

Note that the human blocking may affect several neighbouring sectors, namely the IR sensor may detect this human body blocking in several sequential sectors (shown in FIG. 12 as m−2, m−1, m, m+1, m+2). For all sequential blocked sectors the embodiment uses a reduced threshold $\xi_b$, given by:

$$\xi_b = \alpha(A_{pb} - A_{mb}) + A_{mb} \quad (14)$$

where $A_{pb}$ is the maximum signal amplitude (after strength compensation) in the sequential sectors affected by this human blocking, and $A_{mb}$ is the average signal amplitude in the sequential blocked sectors (after strength compensation).

The reduced threshold is not used in all sectors through which the antennas 213, 215 rotate, because an unnecessarily low threshold will admit much interference into the system and confuse the reflection detection.

When the UWB reflection is blocked by a human body, the reflection from the wall can be very weak, and comparable with the tiny reflection from the human body, although the human body gives very little reflection. In this case, the embodiment may perform IR ranging in this direction to test the distance from the human body to the device. Using this additional information, estimated effects of the UWB reflection from the human body can subtracted from the signal received by the antenna 215, and so be neglected in UWB distance and angle estimations.

Note that processing described above (in the case that the embodiment has determined that a human body is present) might generate a false (pseudo) reflection when there is a human body in a direction sector but no object behind the human body to generate reflections. This does not matter because the positioning algorithm used in Ma Yugang, Sun Xiaobing, Jin Xu and Kanzo Okada, "A system & method for determining position based on reflected signals." Singapore patent application no. 200403720-6 can ignore it. This is because the false reflection will not correspond to any of the reflections from the objects tested when the apparatus was at the origin point, and hence will be ignored.

If the UWB reflection signal is strong (larger than the common threshold $\xi_c$), the embodiment deduces that warm object is not human body. In this case, the reflection process for angle and distance estimations will be carried out in the same way as in the case that no warm object was detected.

Note that since the embodiment uses the UWB signals to make a determination about whether a given warm object is a human body or not, it is able to interpret the significance of the reflected IR signals reliably. It would be much harder to handle the blocking issues of IR ranging and positioning without the assistance of another type of signals, such as UWB signals, because an IR signal hardly passes through a human body.

Figure 13:
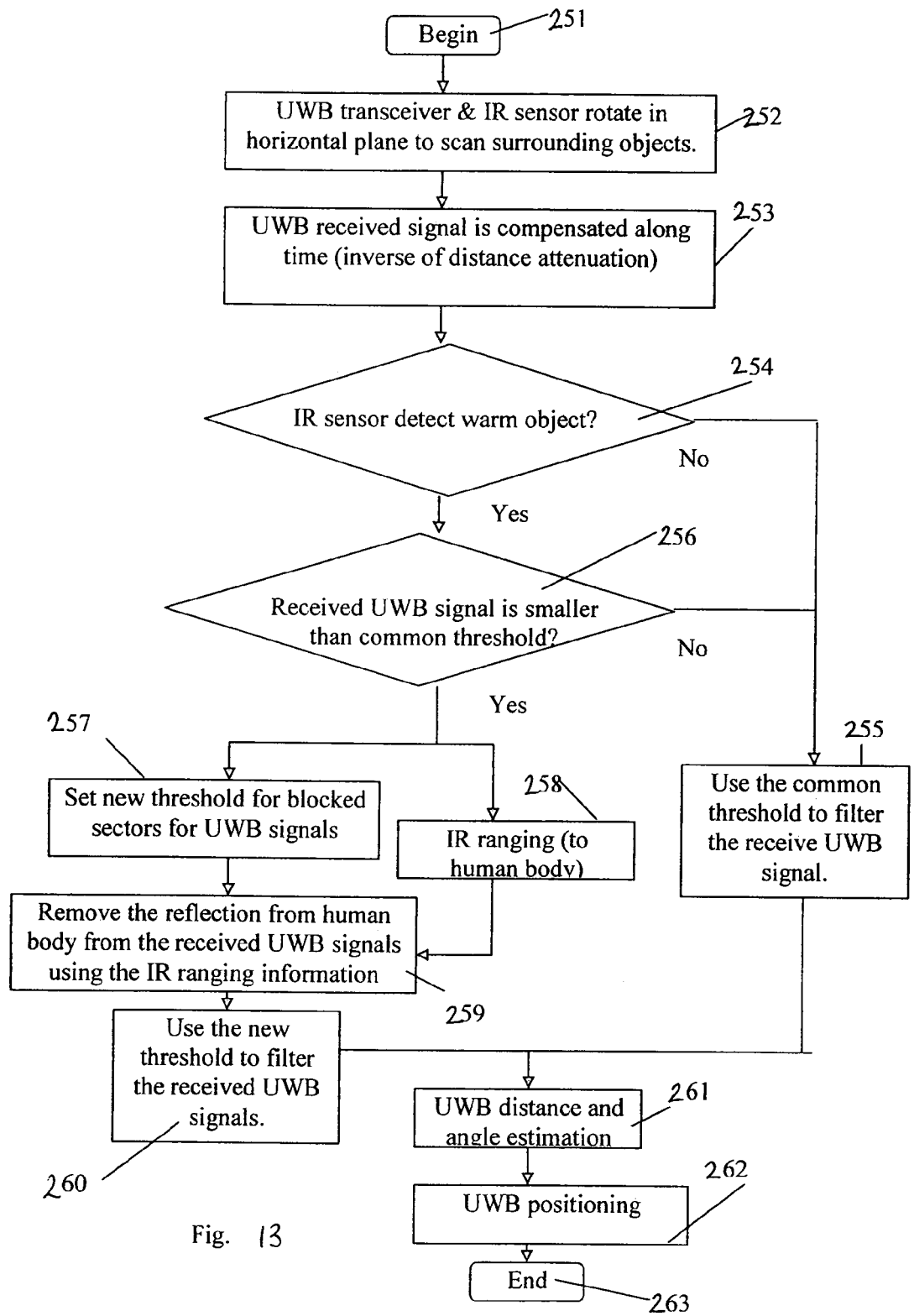
FIG. 13 is a flow diagram of the method performed by the embodiment of FIG. 10.

The algorithm explained above for modifying the positioning algorithm described in Ma Yugang, Sun Xiaobing, Jin Xu and Kanzo Okada, "A system & method for determining position based on reflected signals." Singapore patent application no. 200403720-6 is summarized in FIG. 13. Starting from an initial state 251, the apparatus first scans the antennas 213, 215, 217 around itself, typically with all three being directed in the same direction at any given time (step 252). In step 253 the results are compensated using the compensation factor shown in FIG. 11(b).

In each sector, in step 254 it is determined whether the IR sensor has detected a warm object. If not, the common threshold is used to process the received UWB signal for this sector (step 255). If so, the process passes to step 256 in which it is determined whether the received UWB signal is weaker than the common threshold. If not (i.e. the warm object is determined not to be a human body), the process again passes to step 255. It is to be understood that steps 254 to 256 are performed in turn for each of the sectors.

In the case that a plurality of sectors were found for which the determination in step 256 was positive, the embodiment in step 257 uses the UWB reflection amplitudes for those sectors to obtain the reduced threshold $\xi_b$ from equation (14). If there are two human bodies at different angular positions (each indicated by a series of sectors in which the IR signal indicates a warm body) the embodiment calculates a different reduced threshold $\xi_b$ for each of the bodies.

In parallel to step 257, in step 258 the embodiment uses IR ranging to determine the distance to the warm object identified as a human body. In step 259, the embodiment uses the range to calculate what UWB reflection is expected to be received from a human body at this distance, and removes that estimated signal from the signal actually received by the antenna 215, to produce a corrected received signal.

In step 260, the apparatus uses the threshold obtained in step 257, to process the corrected received signal, to obtain an indication of the reflection from the wall in that sector.

Thus, in summary, in steps 255 and 260, the embodiment identifies the component of the signal received by the antenna 215 which is due to the reflection from a fixed object. Step 255 does this in the case of sectors for which there is no warm object (or a warm object which is identified as non-human), while step 260 does this for sectors where the presence of a human body has been detected.

Using the data produced in this way for all the M sectors, in step 261 the embodiment estimates the distances to the walls 205, 207, 209, and the angular positions of the walls 205, 207, 209 (i.e. the angular position around the apparatus of lines which are normal to those walls). This can be done using the method of Ma Yugang, Kanzo Okada, Sun Xiaobing and Xu Jin, "Weighted Fitting Method for Direction Estimation, and Apparatus employing the Method" Singapore patent application no. 200500140-9. for example.

In step 262, the embodiment uses the result to obtain an estimated position of the apparatus. This can be done using the method of Ma Yugang, Sun Xiaobing, Jin Xu and Kanzo Okada, "A system & method for determining position based on reflected signals." Singapore patent application no. 200403720-6, for example.

In step 263, the method terminates. The sequence of steps shown in FIG. 13 may be performed periodically, and/or whenever the apparatus is translated and/or rotated.

Embodiment 3

Figure 14:
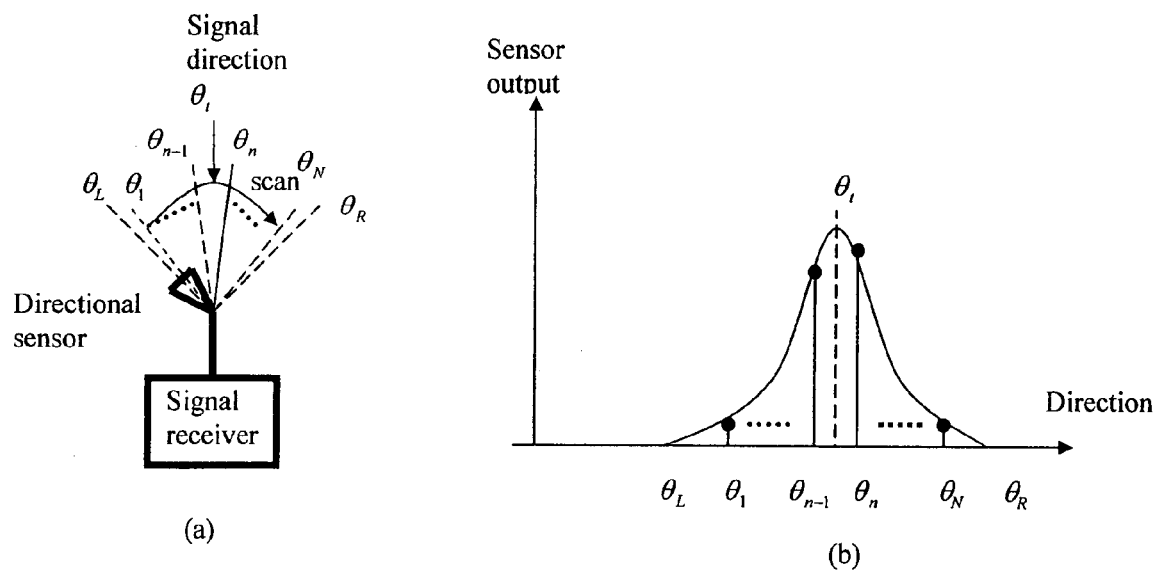
FIG. 14 is composed of FIG. 14(a) and FIG. 14(b) and illustrates the archetypical problem of fitting-based direction estimation, and the relationship between signal magnitude and direction angle for a directional sensor.

A DOA technique which is an embodiment of the invention will now be described. The construction of the embodiment is illustrated in FIG. 14(a)—although as explained below the operation of the signal receiver is different in detail. Once more, the actual signal received, and on which the embodiment operates, is that shown as "Received signal" in FIG. 15. The signal which would be received in the absence of noise (i.e. the one shown in FIG. 14(b)) is denoted here by $f_s$, and is stained by the additive white Gaussian noise (AWGN) $n(\theta)$. Therefore the received signal $f_r(\theta)$ can be represented as $$f_r(\theta) = f_s(\theta) + n(\theta)$$

Following U.S. Pat. No. 6,201,496, we first change the non-linear function to a polynomial by a logarithmic transform. Any of a number of transforms can be used within the scope of the invention, but for easy understanding we just adopt "dB" in the following explanation. The actual received signal in dB (i.e. the "received signal in FIG. 2), $dp_r$, is represented as $$dp_r(\theta) = 20\log f_r(\theta) = 20\log [f_s(\theta) + n(\theta)]$$

On the other hand the signal power $dp_s$ in dB (i.e. the "true function" of FIG. 15), should be $$dp_s(\theta) = 20\log f_s(\theta) = 20\log\left(\frac{1}{\sqrt{2\pi}\,\sigma}\right) - \frac{(\theta - \theta_0)^2}{\sigma^2}\log(e) =$$
$$\frac{-\log(e)}{\sigma^2}(\theta^2 - 2\theta_0\theta + \theta_0^2) + 20\log\left(\frac{1}{\sqrt{2\pi}\,\sigma}\right) = a\theta^2 + b\theta + c$$

where $$\begin{cases} a = -\log(e) \cdot \dfrac{10}{\sigma^2} \\ b = +\log(e) \cdot \dfrac{2\theta_0}{\sigma^2} \\ c = \dfrac{-\log(e)}{\sigma^2}\theta_0^2 + 20\log\left(\dfrac{1}{\sqrt{2\pi}\,\sigma}\right) \end{cases}$$

Figure 15:
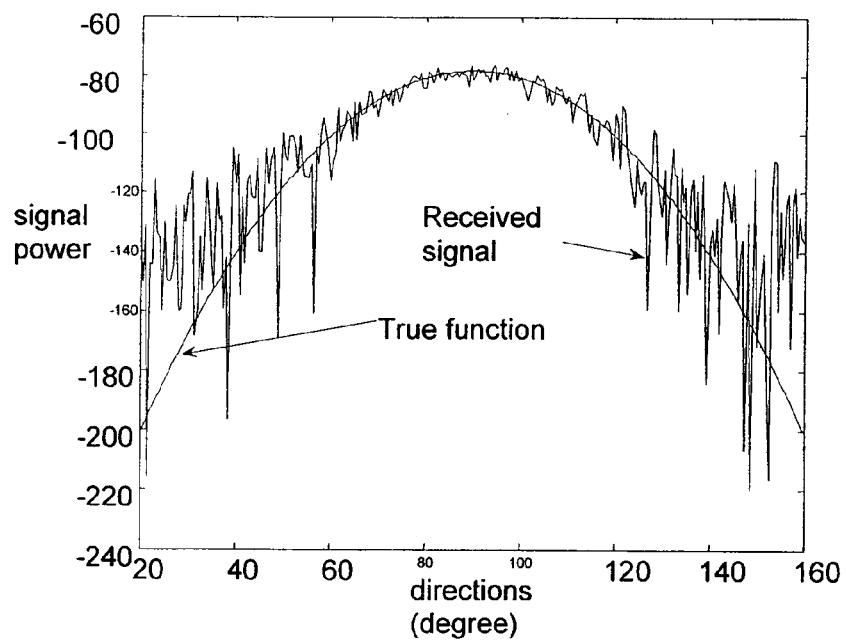
FIG. 15 illustrates the noise-free signal power (in dB) and the real received power (in dB, signal+noise) versus direction angles.

As can be seen, $dp_s$ is an exact second-order polynomial formula (i.e. the "true function" in FIG. 15 is a parabola). However, because of the additive noise, the received samples actually are realised as the "received signal". We can use second-order polynomial fitting to estimate the unknown parameters: a, b, c. After that the DOA estimation would be a simple function of these parameters.

One conventional polynomial fitting algorithm can be stated as,

1) Calculate $$\bar{\theta}_i = \frac{1}{i}\sum_{k=1}^{i}\theta_k$$

and $$d\bar{p}_i = \frac{1}{i}\sum_{k=1}^{i} dp(\theta_k),$$

where $\theta_k$ is the direction angle at which the sample k is received ($\theta_L \leq \theta_k \leq \theta_R$), $dp(\theta_k)$ is the corresponding power in dB of the received signal.

2) The parameter estimation output is $$\begin{bmatrix} \hat{a} \\ \hat{b} \\ \hat{c} \end{bmatrix} = (A^T A)^{-1} A^T Y$$

where $$A = \begin{bmatrix} \bar{\theta}_1^2 \bar{\theta}_1 1 \\ \bar{\theta}_2^2 \bar{\theta}_2 1 \\ \ldots \\ \bar{\theta}_N^2 \bar{\theta}_N 1 \end{bmatrix}, \quad Y = \begin{bmatrix} d\bar{p}_1 \\ d\bar{p}_2 \\ \ldots \\ d\bar{p}_N \end{bmatrix}$$

3). The estimated signal DOA is $$\hat{\theta}_t = \frac{-\hat{b}}{2\hat{a}}$$

We can see, in calculating $\bar{\theta}_i$ and $d\bar{p}_i$ in the conventional fitting, all signal samples have the same weight, although these samples have different SNR.

By contrast, the embodiment operates as follows. To make use of these signal samples more efficiently, the embodiment adopts different weights in terms of SNR. Since the white noise has constant statistical strength in all directions, the weighting in terms of SNR is approximately equal to the weighting in terms of signal strength, which is simpler in practical operations. Accordingly, the embodiment has the following steps:

1) Derive a weight for each signal sample. The weight may be determined as $w_i = p_r(\theta_i)/[p_r(\theta_1) + \ldots + p_r(\theta_N)]$, where $p_r$ is the received power (before logarithmic transform).

2) Calculate $$\bar{\theta}_i' = \frac{1}{i} \sum_{k=1}^{i} w_k \theta_k$$

and $$d\bar{p}_i' = \frac{1}{i} \sum_{k=1}^{i} w_k dp(\theta_k).$$

3) Estimate parameters a, b, c from the following equations:

$$\begin{bmatrix} \hat{a} \\ \hat{b} \\ \hat{c} \end{bmatrix} = (A'^T A')^{-1} A'^T Y'$$

where $$A' = \begin{bmatrix} \bar{\theta}_1'^2 \bar{\theta}_1' 1 \\ \bar{\theta}_2'^2 \bar{\theta}_2' 1 \\ \ldots \\ \bar{\theta}_N'^2 \bar{\theta}_N' 1 \end{bmatrix}, \quad Y' = \begin{bmatrix} d\bar{p}_1' \\ d\bar{p}_2' \\ \ldots \\ d\bar{p}_N' \end{bmatrix}$$

4). The output direction estimation is $$\hat{\theta}_t = \frac{-\hat{b}}{2\hat{a}}$$

Figure 16:
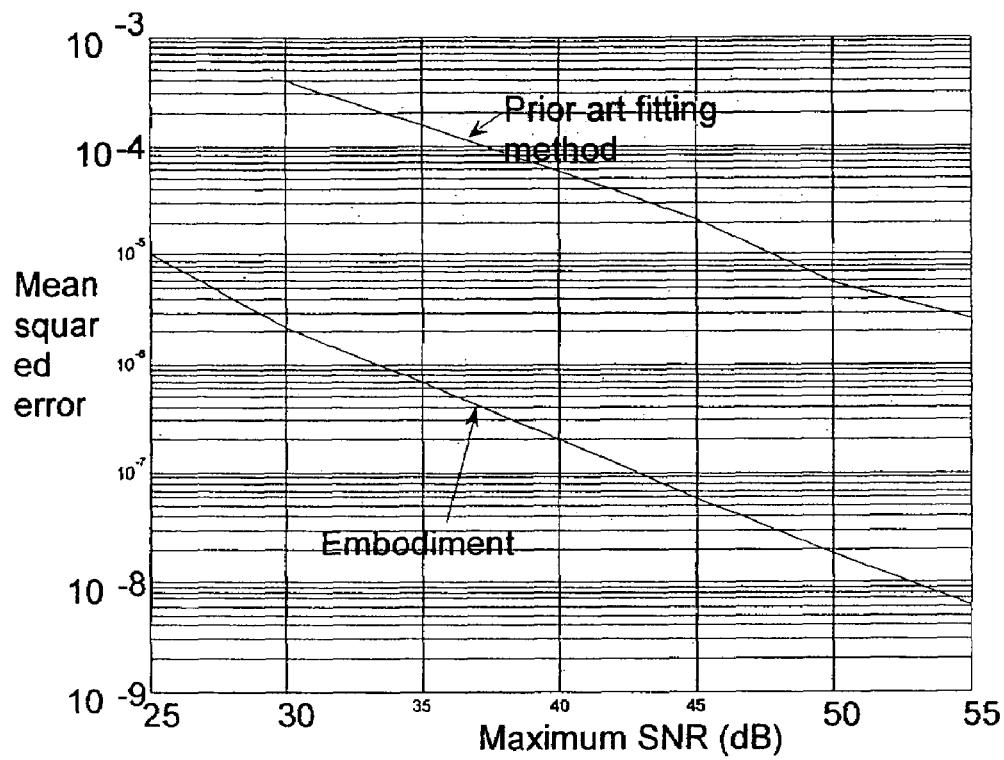
FIGS. 16 to 18 show the simulated MSE versus SNR performance of an estimation approach which is an embodiment of the present invention, as compared with a prior art technique, for different angle ranges and different sample step-sizes.
Figure 17:
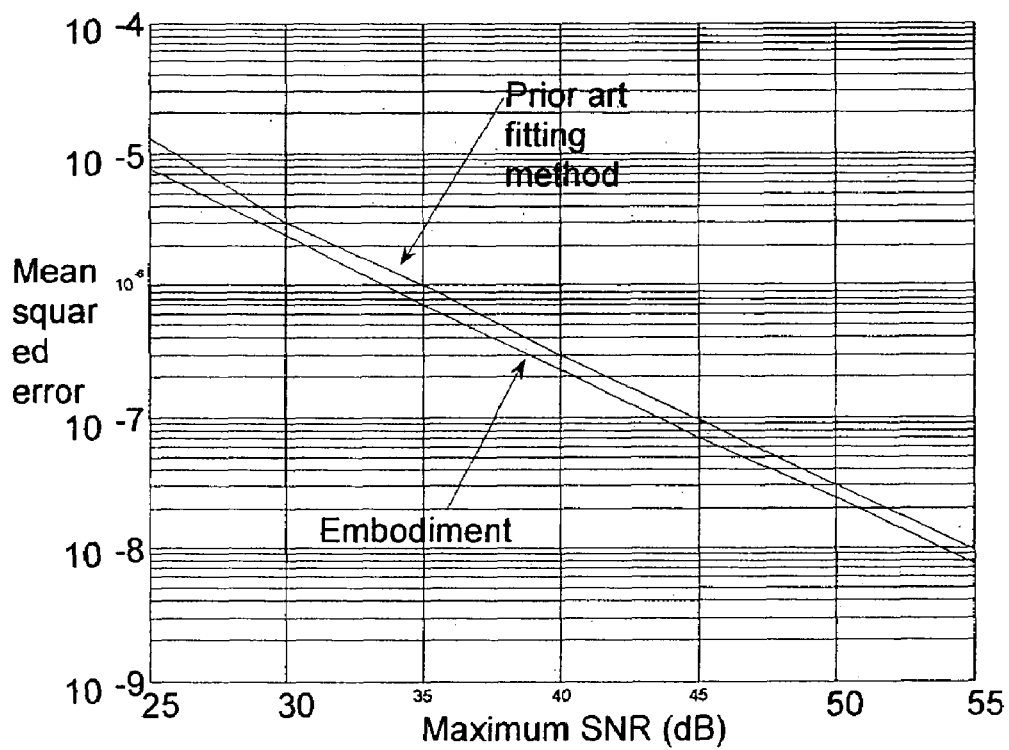
Figure 18:
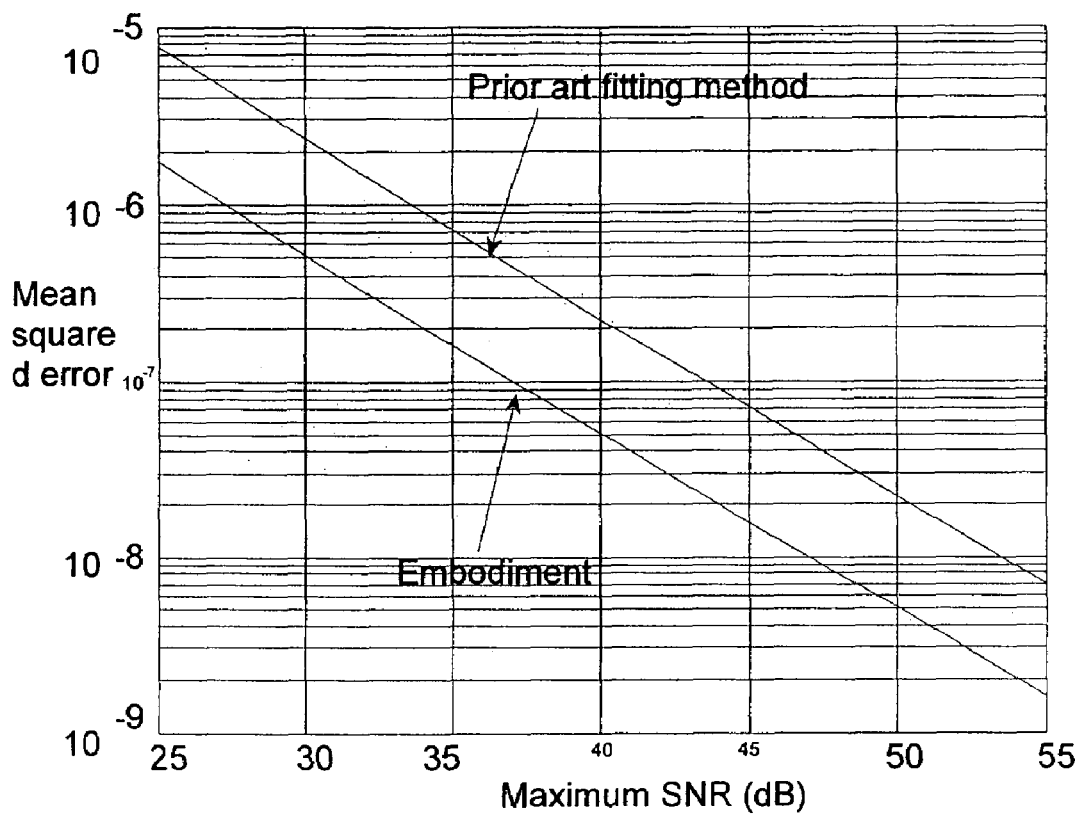
Figure 19:
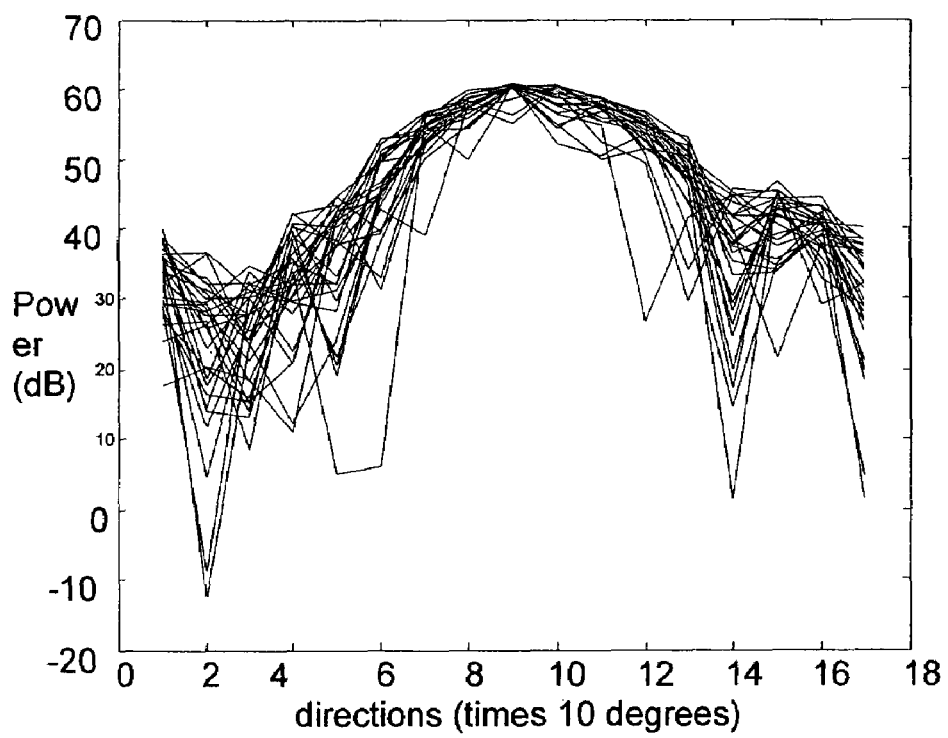
FIG. 19 shows the experimental UWB reflection signals received by a directional antenna in various directions.

To verify the performance of the direction estimation, the second-order polynomial weighed fitting is simulated and experimentally tested. The simulated results are shown in FIGS. 16 to 18. The experimental signals are shown in FIG. 19, and the processing results are given in Table 1.

FIG. 16 shows the mean squared error (MSE) versus SNR of the direction estimation using the embodiment as compared with the prior art fitting method described above. The MSE here is defined as $$MSE = E\left( \left| \frac{\hat{\theta}_0 - \theta_0}{360} \right|^2 \right);$$

the direction angle range is [20, 160]; the direction sample step-size is 10 degrees. We can see the embodiment outperforms the prior art method very much in this case.

FIG. 17. shows the MSE performance of the weighted fitting approach in a smaller directional angle range: [50, 130]. The directional sample step-size is still 10 degrees. We can see that the difference between the embodiment and prior art method becomes smaller if the sample directional range is reduced. This is reasonable because the scan sample range concentrates to the central area, the SNR difference would become small. However, the embodiment is still better than the prior art method.

FIG. 18. shows the MSE in the scan direction angular range: [50, 130] in direction sample step-size of 2 degrees. This means the samples are denser in the same range as in FIG. 17. We can see the fitting performance is improved for both the embodiment and prior art method. However, the factor of improvement for the embodiment is bigger.

FIG. 19 shows experimental results using received UWB signal samples reflected from a 1.2 meter distance wall. We repeated the scanning from 10 degrees to 170 degrees 30 times to obtain the standard deviation (STD).

Table 1 shows the experiment performance of this embodiment compared with the prior art method. In each column the top entry is the scanning range, the middle column is the STD entry for the prior art, and the lower entry is the STD for the embodiment. The step size in each case is 10 degrees. We can see the embodiment can achieve 1.564 degrees accuracy, while the prior art one only 3.3 degrees accuracy, as indicated by the values marked with an asterisk in Table. 1.

TABLE 1

| Angle range (degrees) | 10~170 | 20~160 | 30~150 | 40~140 | 50~130 | 60~120 | 70~110 |
|---|---|---|---|---|---|---|---|
| STD for prior art method | 140.450 | 25.165 | 29.165 | 7.4387 | 3.3236* | 5.7918 | 135.827 |
| STD for embodiment | 1.7490 | 1.5646* | 1.5968 | 1.6908 | 1.7493 | 2.1831 | 20.0531 |

In summary, this embodiment improves the direction estimation accuracy, compared to prior art techniques. If such a method is improved within a positioning system which estimates the position of the signal receiver using incoming signals from two (or more) directions, the positioning accuracy will be higher than in a system employing prior art methods.

Figure 20:
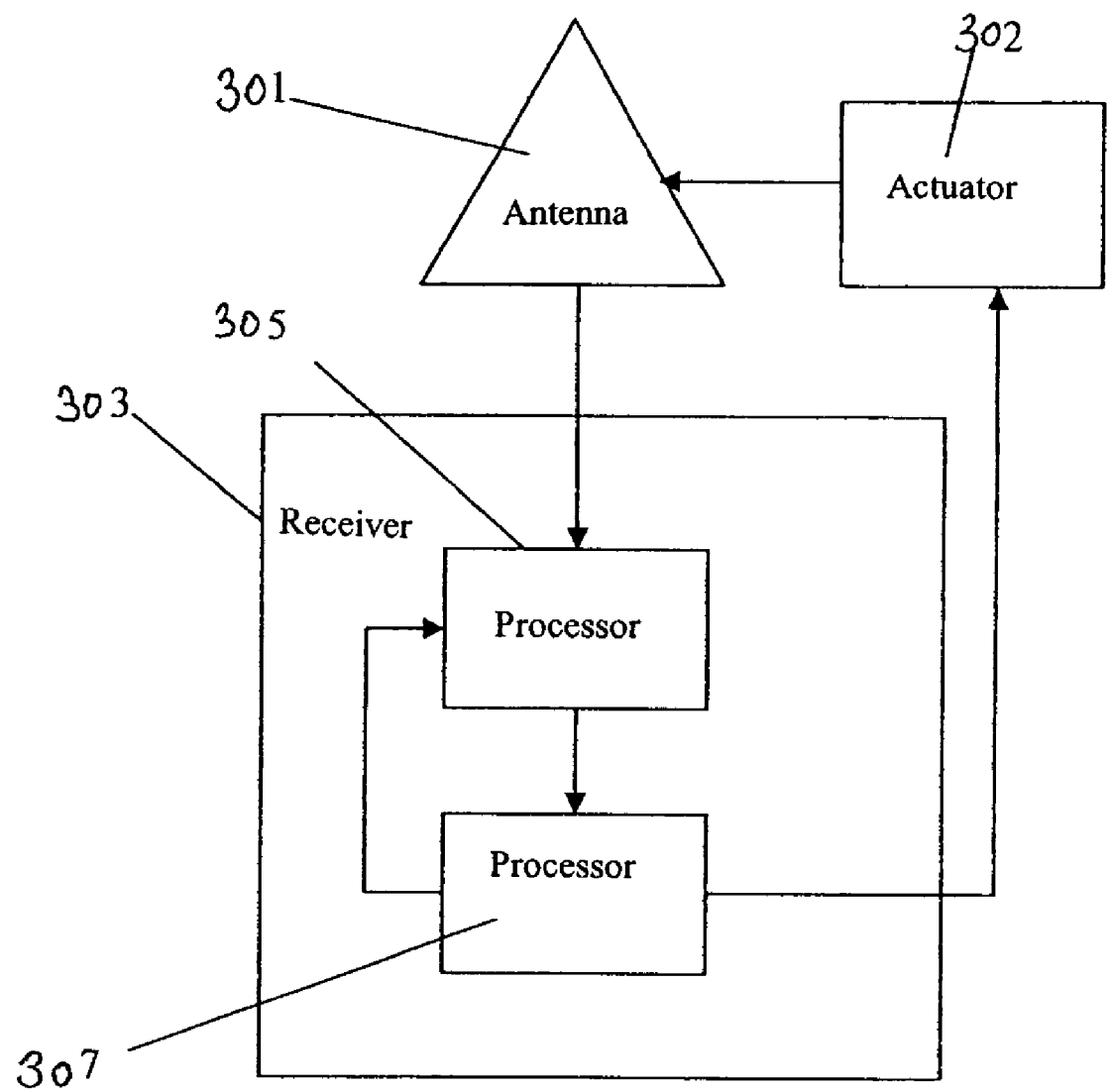
FIG. 20 is a schematic representation of an apparatus which is an embodiment of the invention.

FIG. 20 shows the overall structure of a positioning system which is a possible embodiment of the invention. It includes an antenna 301, an actuator 302 for moving the antenna, and a signal receiver 303. The signal receiver 303 includes a first processor 305 for performing a method as described above to obtain successively a DOA for two signals received from different directions (the system may be able to distinguish them based on their different characteristics, such as different frequencies), and a second processor 307 for controlling the actuator 302 (e.g. to scan respective ranges of angles for each of the signals) and the processing unit 305. The second processor 307 uses the DOAs obtained by the first processing unit 305 to obtain a position estimate by triangulation, according to conventional methods. Of course, in practice the processors 305 and 307 may be simply different software modules operating on a single physical processor.

In an important variation, the weight values $\omega_k$ are chosen as a function of (e.g. proportional to) the gain function of the antenna at the corresponding angle $\theta_k$. For example, if the gain is written as $B(\theta_k-\theta_M)$, where $\theta_M$ is the angle for which B is maximal (i.e. B(0) is the maximal gain), then the weights may be chosen as $\omega_k=B(\theta_k-\theta_M)$. Steps (1) to (4) of the embodiment described above may be performed with these weight values. In other embodiments the weight values may be formed using both the corresponding value of the gain function and the corresponding sample value, e.g. as the product of the two. In a further variation, the weighted fitting can be used in peak time estimation by fitting in the time domain of sample values measured at respective instants to a pulse shape. This may, for example, allow a determination of the distances to the objects which transmitted the signals. In a further possible variation, the antenna may receive signals from any direction within a three-dimensional space, so that the DOA of a given signal is defined by two angles, not one. The techniques proposed above may be extended straightforwardly to this situation, which may for example be used for position finding within a three-dimensional space.

Various modifications to the embodiment of the present invention described above may be made.

The invention claimed is:

1. A system comprising:
    a transmitter for transmitting signals in a number of directions within a range of directions;
    wherein the transmitter comprises a first rotatable antenna;
    a receiver for receiving echoes of the signals from any direction in the range;
    wherein the receiver comprises a second rotatable antenna, the first antenna being mechanically couplable to the second antenna; and
    a processor for processing the received echoes to derive echo data signals indicative of the distance of the system to one or more reflective surfaces and the direction of the one or more reflective surfaces relative to the system;
    wherein the processor is arranged to determine the position of the system relative to a starting position from the derived echo data signals indicative of the distance of the system to one or more of the one or more reflective surfaces and the direction of the one or more of the one or more reflective surfaces relative to the system,
    wherein the circle of rotation of the first rotatable antennae and the circle of rotation of the second ratatable antennae are divided into a same plurality of sectors,
    wherein the first rotatable antennae sequentially generates a pulse of signals in each of the plurality of sectors,
    wherein when the system is at a position other than an origin, the origin being a position at which directions and delays of major reflections detected in one rotation of the first antenna and the second antenna are estimated and recorded, the distance of the system to one or more reflective surfaces is calculated using a known direction that has been estimated at the origin.

2. A system according to claim 1,
    wherein the processor further comprises a storage means for storing data indicative of the distances and directions of the system relative to one or more of the one or more reflective surfaces.

3. A system according to claim 1,
    wherein the processor being arranged to process the received echoes in each sector sequentially.

4. A system according to claim 1,
    wherein the receiver comprises an envelope detection stage for detecting an envelope of waveforms corresponding to each of the received echo signals.

5. A system according to claim 4, wherein the receiver further comprises an amplitude threshold stage couplable to the envelope receiving stage and arranged to slice the envelope of each waveform corresponding to each of the received echo signals at a reference level relative to an average level of the received echo signals in a selected sector of rotation of the first antennae and the second antennae.

6. A system according to claim 5,
    wherein the receiver further comprises a first filter couplable to the amplitude threshold stage for filtering in the time domain each sliced waveform.

7. A system according to claim 6,
    wherein the receiver further comprises a second filter couplable to the first filter to filter in the space domain each sliced waveform filtered in the time domain and to group in the space domain the reflected signals according to the reflective surface from which each signal was reflected, the second filter having an output.

8. A system according to claim 7,
wherein the receiver further comprises a Gaussian fitting stage for determining a Gaussian function fitting the space domain filtered and outputted from the second filter.

9. A system according to claim 8,
wherein the Gaussian fitting stage determines a Gaussian function fitting the space domain filtered and outputted from the second filter using a least squares method.

10. A system according to claim 8,
the receiver further comprising a peak determination stage couplable to the Gaussian fitting stage to determine a peak of the Gaussian function corresponding to the direction of the one or more of the one or more reflective surfaces relative to the system.

11. A system according to claim 10,
the receiver further comprising a time measuring stage for measuring time taken from transmission of a signal by the transmitter to reception of an echo signal received by the receiver corresponding to the transmitted signal to determine a distance indicative of the distance of the system to a reflective surface from which the received echo signal is reflected.

12. A system according to claim 1,
wherein the transmitted signals comprise any one or more of ultrawide band signals, radio frequency signals, ultrasound, or infrared.

13. A system according to claim 1,
wherein the first and/or the second antenna comprises a directional antenna.

14. A system according to claim 13,
wherein the first antennae and/or the second antennae comprise one or more mechanically rotatable antennae each having an associated beam pattern gain associated with a beam pattern,
the system further comprising one or more electrically rotatable antennae,
wherein the one or more electrically rotatable antennae are arranged to be rotatable by varying the gain of the beam patterns of the one or more mechanically rotatable antennae.

15. A method for determining the position of a system comprising:
transmitting signals in a number of directions within a range of directions using a transmitter comprising a first rotatable antenna;
receiving echoes of the signals from any direction in the range using a receiver;
wherein the receiver comprises a second rotatable antenna, the first antenna being mechanically couplable to the second antenna; and
processing the received echoes to derive echo data signals indicative of the distance of the system to one or more reflective surfaces and the direction of the one or more reflective surfaces relative to the system;
wherein the step of processing comprises determining the position of the system relative to a starting position from the derived echo data signals indicative of the distance of the system to one or more of the one or more reflective surfaces and the direction of the one or more of the one or more reflective surfaces relative to the system,
wherein the circle of rotation of the first rotatable antennae and the circle of rotation of the second ratatable antennae are divided into a same plurality of sectors,
wherein the first rotatable antennae sequentially generates a pulse of signals in each of the plurality of sectors,
wherein when the system is at a position other than an origin, the origin being a position at which directions and delays of major reflections detected in one rotation of the first antenna and the second antenna are estimated and recorded, the distance of the system to one or more reflective surfaces is calculated using a known direction that has been estimated at the origin.

16. A method according to claim 15,
wherein the processing step further comprises storing data indicative of the distances and directions of the system relative to one or more of the one or more reflective surfaces.

17. A method according to claim 15,
further comprising processing the received echoes in each sector sequentially.

18. A method according to claim 15,
wherein the processing step further comprises detecting in the receiver an envelope of waveforms corresponding to each of the received echo signals.

19. A method according to claim 15,
wherein the processing step further comprises slicing in an amplitude threshold stage in the receiver the envelope of each waveform corresponding to each of the received echo signals at a reference level relative to an average level of the received echo signals in a selected sector of rotation of the first and second antennae.

20. A method according to claim 19,
wherein the processing step further comprises filtering in the time domain each sliced waveform using a first filter.

21. A method according to claim 20,
wherein the processing step further comprises filtering using a second filter in the space domain each sliced waveform filtered in the time domain and grouping in the space domain the reflected signals according to the reflective surface from which each signal was reflected, the filter having an output.

22. A method according to claim 21,
wherein the processing step further comprises determining a Gaussian function fitting the space domain filtered and outputted from the filter.

23. A method according to claim 22,
wherein the Gaussian function determination step comprises determining a Gaussian function fitting the space domain filtered and outputted from the filter using a least squares method.

24. A method according claim 22,
wherein the processing step further comprises determining a peak of the Gaussian function corresponding to the direction of one or more of the one or more reflective surfaces relative to the system whose position is being determined.

25. A method according to claim 24,
wherein the processing step further comprises measuring time taken from transmission of a signal by the transmitter to reception of an echo signal received by the receiver corresponding to the transmitted signal to determine a distance indicative of the distance of the system to a reflective surface from which the received echo signal is reflected.

26. A method according to claim 15,
wherein the transmitting step comprises transmitting signals comprised of any one or more of ultrawide band signals, radio frequency signals, ultrasound, or infrared.

27. A method according claim 15,
wherein the transmitting step comprises transmitting signals from a directional antenna.

28. A method according to claim 15,
wherein the receiving step comprises receiving signals using a directional antenna.

29. A method according to claim 27,
wherein the transmitting step comprises transmitting signals from one or more mechanically rotatable antennae each having an associated beam pattern gain associated with a beam pattern,
the transmitting step further comprising transmitting signals from one or more electrically rotatable antennae by varying the gain of the beam patterns of the one or more mechanically rotatable antennae.

30. A method according to claim 27,
wherein the receiving step comprises receiving signals using one or more mechanically rotatable antennae each having an associated beam pattern gain associated with a beam pattern,
the receiving step further comprising receiving signals using one or more electrically rotatable antennae by varying the gain of the beam patterns of the one or more mechanically rotatable antennae.

31. The system according to claim 1, wherein the one or more reflective surfaces are located within a positioning area.

32. The system according to claim 31, wherein the positioning area has a fixed peripheral shape in a first plane, the first and second antennae being rotatable in the first plane.

33. The system according to claim 32 wherein the positioning area has a polygonal peripheral shape in the first plane.

34. The system according to claim 33, wherein the processor further comprises an origin determining stage for determining an origin position for the system.

35. The system according to claim 34, wherein the processor is further arranged to determine if two or more reflected echo signals have maintained their directions relative to the system.

36. The system according to claim 35, wherein the processor is further arranged to select a pair of the two or more reflected echo signals determined to have maintained their directions relative to the system as determined at the origin position.

37. The system according to claim 36, wherein the selected pair of the two or more reflected echo signals differ in their directions by at least $\pi/4$.

38. The system according to claim 36, wherein the processor is arranged to determine a change in distance of the system from the reflective surfaces causing the reflected echo signals of the selected pair.

39. The system according to claim 38, wherein the processor is arranged to determine the position of the system relative to the origin based on the determined change in distance of the system from the reflective surfaces.

40. The system according to claim 35, wherein the processor is arranged to select any two or more pairs of the two or more reflected echo signals which have been determined to have maintained their directions relative to the system, and determining the position of the system relative to the origin based on an average of the position determined from each pair.

41. The system according to claim 34, wherein the processor is arranged to determine if any of the one or more reflective surfaces have not changed their direction relative to the system from the direction measured at the origin position, and if it is determined that none of the one or more reflective surfaces has not changed its direction the processor is arranged to determine the position of the system based on the change in the distance(s) of the one or more reflective surfaces from a previously measured position.

42. The system according to claim 41, wherein the processor is arranged to select a pair of reflected echo signals determined not to have changed their directions relative to the system as determined at the previously measured position.

43. The system according to claim 42, wherein the selected pair of the two or more reflected echo signals differ in their directions by at least $\geq \pi/4$.

44. The system according to claim 41, wherein the processor is arranged to determine a change in distance of the system from the reflective surfaces causing the reflected echo signals of the selected pair.

45. The system according to claim 44, wherein the processor is arranged to determine the position of the system relative to the previously measured position based on the determined change in distance of the system from the reflective surfaces.

46. The system according to claim 41, wherein the processor is arranged to select any two or more pairs of the two or more reflected echo signals which have been determined to have maintained their directions relative to the system at the previously measured position, and determining the position of the system relative to the origin based on an average of the position determined from each pair.

47. The system according to claim 41, wherein the processor is arranged to determine the position of the system relative to the origin by adding the changes in position determined from a previously measured position to the position determined previously.

48. The method according to claim 15, wherein the one or more reflective surfaces are located within a positioning area having a peripheral shape in a first plane, the first and second antennae being rotatable in the first plane, the processing step further comprising determining an origin position for the system whose position is to be determined.

49. The method according to claim 48, wherein the positioning area has a polygonal peripheral shape in the first plane, and wherein the processing step further comprises determining if two or more reflected echo signals have maintained their directions relative to the system whose position is to be measured.

50. The method according to claim 49, wherein the processing step further comprises selecting a pair of the two or more reflected echo signals determined to have maintained their directions relative to the system as determined at the origin position.

51. The method according to claim 50, wherein selecting step comprises selecting a pair of the two or more reflected echo signals which differ in their directions by at least $\pi/4$.

52. The method according to claim 50, wherein the processing step further comprises determining a change in distance of the system from the reflective surfaces causing the reflected echo signals of the selected pair.

53. The method according to claim 52, wherein the processing step further comprises determining the position of the system relative to the origin based on the determined change in distance of the system from the reflective surfaces.

54. The method according to claim 49, wherein the processing step further comprises selecting any two or more pairs of the two or more reflected echo signals which have been determined to have maintained their directions relative to the system, and determining the position of the system relative to the origin based on an average of the position determined from each pair.

55. The method according to claim 48, wherein the processing step further comprises determining if any of the one or more reflective surfaces have not changed their direction relative to the system from the direction measured at the origin position, and if it is determined that none of the one or more reflective surfaces has not changed its direction, determining the position of the system based on the change in the distance(s) of the one or more reflective surfaces from a previously measured position.

56. The method according to claim 55, wherein the processing step further comprises selecting a pair of reflected echo signals determined not to have changed their directions relative to the system as determined at the previously measured position.

57. The method according to claim 56, wherein the step of selecting comprises selecting a pair of the two or more reflected echo signals which differ in their directions by at least $\pi/4$.

58. The method according to claim 55, wherein the processing step determines a change in distance of the system from the reflective surfaces causing the reflected echo signals of the selected pair.

59. The method according to claim 58, wherein the processing step further comprises determining the position of the system relative to the previously measured position based on the determined change in distance of the system from the reflective surfaces.

60. The method according to claim 55, wherein the processing step further comprises selecting any two or more pairs of the two or more reflected echo signals which have been determined to have maintained their directions relative to the system at the previously measured position, and determining the position of the system relative to the origin based on an average of the position determined from each pair.

61. The method according to claim 60, wherein the processing step further comprises determining the position of the system relative to the origin by adding the changes in position determined from a previously measured position to the position determined previously.

* * * * *